(12) United States Patent
Nguyen

(10) Patent No.: US 11,532,204 B2
(45) Date of Patent: *Dec. 20, 2022

(54) SOCIAL GAME PLAY WITH GAMES OF CHANCE

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,316

(22) Filed: Mar. 18, 2019

(65) Prior Publication Data

US 2019/0213829 A1    Jul. 11, 2019

Related U.S. Application Data

(60) Continuation of application No. 13/801,171, filed on Mar. 13, 2013, now Pat. No. 10,235,831, which is a division of application No. 13/296,182, filed on Nov. 14, 2011, now Pat. No. 9,595,161.

(60) Provisional application No. 61/413,477, filed on Nov. 14, 2010.

(51) Int. Cl.
*G07F 17/32* (2006.01)
*A63F 13/335* (2014.01)
*A63F 13/80* (2014.01)

(52) U.S. Cl.
CPC ........ *G07F 17/3225* (2013.01); *A63F 13/335* (2014.09); *A63F 13/80* (2014.09); *G07F 17/3248* (2013.01); *G07F 17/3251* (2013.01); *G07F 17/3253* (2013.01); *G07F 17/3269* (2013.01); *G07F 17/3272* (2013.01); *G07F 17/3281* (2013.01)

(58) Field of Classification Search
CPC ....................................................... G07F 17/34
USPC ............................................................ 463/42
See application file for complete search history.

(56) References Cited

U.S. PATENT DOCUMENTS 2,033,638 A    3/1936 Koppl
2,062,923 A    12/1936 Nagy
4,741,539 A    5/1988 Sutton et al.
(Continued)

FOREIGN PATENT DOCUMENTS

GB    2033638    5/1980
GB    2062923    5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

*Primary Examiner* — Robert T Clarke, Jr.
(74) *Attorney, Agent, or Firm* — McAndrews, Held & Malloy, Ltd.

(57) ABSTRACT

In one embodiment, a system, apparatus, and method for social gaming may include a gaming machine configured to play a game of chance and produce game information. A social gaming server can be configured to communicate with the gaming machine, may establish a remote gaming session between the gaming machine and a user device, and may distribute the portion of the game information to the user device.

14 Claims, 15 Drawing Sheets

(56) References Cited

U.S. PATENT DOCUMENTS

| | | |
|---|---|---|
| 4,948,138 A | 8/1990 | Pease et al. |
| 4,969,183 A | 11/1990 | Reese |
| 5,067,712 A | 11/1991 | Georgilas |
| 5,275,400 A | 1/1994 | Weingardt |
| 5,429,361 A | 7/1995 | Raven et al. |
| 5,489,103 A | 2/1996 | Okamoto |
| 5,618,232 A | 4/1997 | Martin |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,050,895 A | 4/2000 | Luciano, Jr. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,271 A | 11/2000 | Kadici |
| 6,146,273 A | 11/2000 | Olsen |
| 6,165,071 A | 12/2000 | Weiss |
| 6,231,445 B1 | 5/2001 | Acres |
| 6,235,820 B1 | 5/2001 | Lassila |
| 6,244,958 B1 | 6/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,326,116 B2 | 12/2001 | Yuasa |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,439,747 B1 | 8/2002 | Liu |
| 6,443,452 B1 | 9/2002 | Brune |
| 6,491,584 B2 | 12/2002 | Graham et al. |
| 6,500,067 B1 | 12/2002 | Luciano |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,675,152 B1 | 1/2004 | Prasad |
| 6,699,128 B1 | 3/2004 | Beadell |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,764,537 B2 | 7/2004 | Zhuang |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,837,793 B2 | 1/2005 | McClintic |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers et al. |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| 7,198,571 B2 | 4/2007 | LeMay |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 * | 12/2007 | Danieli ............... A63F 13/12 |
| | | 463/42 |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,682,239 B2 | 3/2010 | Friedman |
| 7,693,306 B2 | 4/2010 | Huber |
| 7,699,703 B2 | 4/2010 | Muir et al. |
| 7,722,453 B2 | 5/2010 | Lark et al. |
| 7,742,996 B1 | 6/2010 | Kwan |
| 7,758,423 B2 | 7/2010 | Foster et al. |
| 7,771,271 B2 | 8/2010 | Walker et al. |
| 7,780,529 B2 | 8/2010 | Rowe et al. |

(56) References Cited

U.S. PATENT DOCUMENTS

| | | |
|---|---|---|
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh et al. |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,276,010 B2 | 9/2012 | Vavilala |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Hornik et al. |
| 8,430,745 B2 | 4/2013 | Agarwal et al. |
| 8,461,958 B2 | 6/2013 | Saenz |
| 8,465,368 B2 | 6/2013 | Hardy et al. |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether et al. |
| 8,613,659 B2 | 12/2013 | Nelson et al. |
| 8,678,901 B1 | 3/2014 | Kelly |
| 8,696,470 B2 | 4/2014 | Nguyen |
| 8,745,417 B2 | 6/2014 | Huang et al. |
| 8,821,255 B1 | 9/2014 | Friedman |
| 8,834,254 B2 | 9/2014 | Buchholz et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,180,362 B2 | 11/2015 | Herrman |
| 9,235,952 B2 | 1/2016 | Nguyen |
| 9,292,996 B2 | 3/2016 | Davis et al. |
| 9,325,203 B2 | 4/2016 | Nguyen |
| 9,403,093 B2 | 8/2016 | Harrington |
| 9,443,390 B2 | 9/2016 | Lemay |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson et al. |
| 9,576,425 B2 | 2/2017 | Nguyen |
| 9,626,826 B2 | 4/2017 | Nguyen |
| 9,666,015 B2 | 5/2017 | Acres |
| 9,666,021 B2 | 5/2017 | Nguyen |
| 9,672,686 B2 | 6/2017 | Nguyen |
| 9,697,672 B2 | 7/2017 | Thomas |
| 9,741,205 B2 | 8/2017 | Nguyen |
| 9,773,371 B2 | 9/2017 | Arnone |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,068,429 B2 | 9/2018 | Gagner et al. |
| 10,115,270 B2 | 10/2018 | Gagner et al. |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 10,796,679 B1 | 10/2020 | Powell |
| 10,818,133 B2 | 10/2020 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0025272 A1 | 9/2001 | Mori |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0107065 A1 | 8/2002 | Rowe |
| 2002/0107799 A1* | 8/2002 | Hoshino et al. ....... G06Q 30/06 705/41 |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0145051 A1 | 10/2002 | Charrin |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0004871 A1 | 1/2003 | Rowe et al. |
| 2003/0008696 A1 | 1/2003 | Abecassis et al. |
| 2003/0013531 A1 | 1/2003 | Rowe |
| 2003/0027635 A1 | 2/2003 | Walker et al. |
| 2003/0064805 A1 | 4/2003 | Wells |
| 2003/0064807 A1 | 4/2003 | Walker et al. |
| 2003/0078094 A1 | 4/2003 | Gatto |
| 2003/0092480 A1 | 5/2003 | White et al. |
| 2003/0100361 A1 | 5/2003 | Sharpless et al. |
| 2003/0103965 A1 | 6/2003 | Jung |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082384 A1 | 4/2004 | Walker |
| 2004/0082385 A1 | 4/2004 | Silva et al. |
| 2004/0094624 A1 | 5/2004 | Fernandes |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0142744 A1 | 7/2004 | Atkinson |
| 2004/0147308 A1 | 7/2004 | Walker et al. |

(56) References Cited

U.S. PATENT DOCUMENTS

| | | |
|---|---|---|
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | Odonovan et al. |
| 2004/0229671 A1 | 11/2004 | Stronach |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0018170 A1 | 1/2005 | Fujimori |
| 2005/0026696 A1 | 2/2005 | Hashimoto et al. |
| 2005/0033651 A1 | 2/2005 | Kogan |
| 2005/0043996 A1 | 2/2005 | Silver |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0143169 A1 | 6/2005 | Nguyen |
| 2005/0167921 A1 | 8/2005 | Finocchio |
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202865 A1 | 9/2005 | Kim |
| 2005/0202875 A1 | 9/2005 | Murphy et al. |
| 2005/0208993 A1 | 9/2005 | Yoshizawa |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0068897 A1 | 3/2006 | Sanford |
| 2006/0073869 A1 | 4/2006 | LeMay et al. |
| 2006/0073888 A1 | 4/2006 | Nguyen |
| 2006/0073897 A1 | 4/2006 | Englman et al. |
| 2006/0079317 A1 | 4/2006 | Flemming et al. |
| 2006/0121972 A1 | 6/2006 | Walker |
| 2006/0126529 A1 | 6/2006 | Hardy |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0256135 A1* | 11/2006 | Aoyama ............... A63F 13/53 345/629 |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0129148 A1 | 6/2007 | Van Luchene |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0235521 A1 | 10/2007 | Mateen |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259716 A1 | 11/2007 | Mattice |
| 2007/0259717 A1 | 11/2007 | Mattice et al. |
| 2007/0265984 A1 | 11/2007 | Santhana |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298858 A1 | 12/2007 | Toneguzzo |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0020845 A1 | 1/2008 | Low |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102935 A1 | 5/2008 | Finnimore |
| 2008/0102956 A1 | 5/2008 | Burman et al. |
| 2008/0102957 A1 | 5/2008 | Burnman et al. |
| 2008/0108401 A1 | 5/2008 | Baerlocker et al. |
| 2008/0113772 A1 | 5/2008 | Burrill et al. |
| 2008/0119267 A1 | 5/2008 | Denlay |
| 2008/0126529 A1 | 5/2008 | Kim |
| 2008/0013906 A1 | 6/2008 | Lutnick |
| 2008/0139274 A1 | 6/2008 | Baerlocher |
| 2008/0139306 A1 | 6/2008 | Lutnick |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0167118 A1 | 7/2008 | Kroeckel |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0167130 A1 | 9/2008 | Koreckel |
| 2008/0214258 A1 | 9/2008 | Brosnan et al. |
| 2008/0214310 A1 | 9/2008 | Brunet de Courssou |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0268959 A1 | 10/2008 | Bryson |
| 2008/0293478 A1 | 11/2008 | Anderson |
| 2008/0300058 A1 | 12/2008 | Sum et al. |
| 2008/0305864 A1 | 12/2008 | Kelly et al. |

(56) References Cited

U.S. PATENT DOCUMENTS

| | | |
|---|---|---|
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318668 A1 | 12/2008 | Ching |
| 2008/0318669 A1 | 12/2008 | Buchholz |
| 2008/0318686 A1 | 12/2008 | Crowder et al. |
| 2009/0000213 A1 | 1/2009 | Coopman |
| 2009/0005165 A1 | 1/2009 | Arezina et al. |
| 2009/0011822 A1 | 1/2009 | Englman |
| 2009/0017906 A1 | 1/2009 | Jackson |
| 2009/0021381 A1 | 1/2009 | Higuchi |
| 2009/0029766 A1 | 1/2009 | Lutnick et al. |
| 2009/0054149 A1 | 2/2009 | Brosnan et al. |
| 2009/0061990 A1 | 3/2009 | Schwartz |
| 2009/0069063 A1 | 3/2009 | Thomas |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131146 A1 | 5/2009 | Arezina et al. |
| 2009/0131151 A1 | 5/2009 | Harris et al. |
| 2009/0131155 A1 | 5/2009 | Hollibaugh |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0143141 A1 | 6/2009 | Wells |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Henmnann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0270166 A1 | 10/2009 | Thukral |
| 2009/0270170 A1 | 10/2009 | Patton |
| 2009/0271287 A1 | 10/2009 | Halpern |
| 2009/0275402 A1 | 11/2009 | Backover |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Henmnann |
| 2010/0049738 A1 | 2/2010 | Mathur et al. |
| 2010/0056248 A1 | 3/2010 | Acres |
| 2010/0062833 A1 | 3/2010 | Mattice et al. |
| 2010/0062840 A1 | 3/2010 | Henmnann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0105454 A1 | 4/2010 | Weber et al. |
| 2010/0106612 A1 | 4/2010 | Gupta |
| 2010/0115591 A1 | 5/2010 | Kane-Esrig |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Henmnann |
| 2010/0160043 A1 | 6/2010 | Fujimoto et al. |
| 2010/0178977 A1 | 7/2010 | Kim et al. |
| 2010/0184509 A1 | 7/2010 | Sylla |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203957 A1 | 8/2010 | Enzminger |
| 2010/0203963 A1 | 8/2010 | Allen |
| 2010/0216553 A1 | 8/2010 | Chudley |
| 2010/0227662 A1 | 9/2010 | Speers et al. |
| 2010/0227670 A1 | 9/2010 | Arezine et al. |
| 2010/0227671 A1 | 9/2010 | Laaroussi |
| 2010/0227682 A1 | 9/2010 | Reville |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0053679 A1 | 3/2011 | Canterbury et al. |
| 2011/0065492 A1 | 3/2011 | Acres |
| 2011/0076941 A1 | 3/2011 | Taveau |
| 2011/0081958 A1 | 4/2011 | Herrmann |
| 2011/0086696 A1 | 4/2011 | MacEwan |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0201414 A1 | 8/2011 | Barclay |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0244952 A1 | 10/2011 | Schueller |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 * | 2/2012 | Barclay ............... G07F 17/3218 463/42 |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0115591 A1 | 5/2012 | Palermo |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0185398 A1 | 7/2012 | Weis |
| 2012/0190426 A1 | 7/2012 | Acres |
| 2012/0194448 A1 | 8/2012 | Rothkopf |
| 2012/0202587 A1 | 8/2012 | Allen |
| 2012/0208618 A1 | 8/2012 | Frerking |
| 2012/0214564 A1 | 8/2012 | Barclay |
| 2012/0231885 A1 | 9/2012 | Speer, II |
| 2012/0239566 A1 | 9/2012 | Everett |
| 2012/0244950 A1 | 9/2012 | Braun |
| 2012/0322545 A1 | 12/2012 | Arnone |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0103965 A1 | 4/2013 | Golembeski |
| 2013/0104193 A1 | 4/2013 | Gatto et al. |
| 2013/0130766 A1 | 5/2013 | Harris et al. |

(56) References Cited

U.S. PATENT DOCUMENTS

| | | |
|---|---|---|
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210512 A1 | 8/2013 | Meyer |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0281187 A1 | 10/2013 | Skelton |
| 2013/0303265 A1 | 11/2013 | Wilkins |
| 2013/0316808 A1 | 11/2013 | Nelson |
| 2013/0337878 A1 | 12/2013 | Shepherd |
| 2013/0337889 A1 | 12/2013 | Gagner |
| 2014/0006129 A1 | 1/2014 | Heath |
| 2014/0057716 A1 | 2/2014 | Massing et al. |
| 2014/0087814 A1 | 3/2014 | Babineau |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 8/2015 | Phegade |
| 2015/0379812 A1 | 12/2015 | Arnone |
| 2016/0125695 A1 | 5/2016 | Nguyen |
| 2016/0148465 A1 | 5/2016 | Arnone |
| 2017/0016819 A1 | 4/2017 | Nguyen |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0243440 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |
| 2019/0122490 A1 | 4/2019 | Nguyen |
| 2019/0122492 A1 | 4/2019 | Nguyen |
| 2019/0213829 A1 | 7/2019 | Nguyen |
| 2020/0372753 A1 | 11/2020 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | 2010002897 | 1/2010 |
| WO | WO 2010/017252 A1 | 2/2010 |
| WO | 2010028322 A1 | 3/2010 |
| WO | 2010115063 A1 | 10/2010 |

OTHER PUBLICATIONS

Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAps, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.

(56) References Cited

OTHER PUBLICATIONS

Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, mailed Jun. 28, 2016.
Notice of Allowance for U.S. Appl. No. 13/833,953, dated Jul. 6, 2016.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/843,192, dated May 8, 2014.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.

(56) References Cited

OTHER PUBLICATIONS

Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, mailed Aug. 15, 2014.
Final OA for U.S. Appl. No. 13/801,256, mailed Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for US Patent Application No. 16/162.358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.

(56) References Cited

OTHER PUBLICATIONS

Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/835,448, dated Mar. 5, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
"Professional Casino Slot Machine", Posted at www.vbtutor.net/VB.Sample/vbslot2.htm on Oct. 20, 2009.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.
Advisory Action for U.S. Appl. No. 13/632,828, dated Feb. 25, 2016.
Final Office Action for U.S. Appl. No. 13/801,171, dated May 21, 2014.
Final Office Action for U.S. Appl. No. 13/801,234, dated May 22, 2014.
Advisory Action for U.S. Appl. No. 13/296,182, dated May 8, 2014.
Notice of Allowance for U.S. Appl. No. 13/843,192, dated Aug. 10, 2016.
Notice of Allowance for U.S. Appl. No. 13/801,256, dated Apr. 20, 2017.
Office Action for U.S. Appl. No. 16/190,050, dated Jun. 1, 2020.
Office Action for U.S. Appl. No. 16/559,553, dated Jun. 1, 2021.
Notice of Allowance for U.S. Appl. No. 16/579,754, dated Jul. 16, 2021.
Office Action for U.S. Appl. No. 13/622,702, dated Jul. 19, 2021.
Office Action for U.S. Appl. No. 16/357,316, dated Jul. 20, 2021.
Office Action for U.S. Appl. No. 16/993,154, dated Jul. 28, 2021.
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 16/183,632, dated May 4, 2021.
Office Action (Non-Final Rejection) dated Jul. 18, 2022 for U.S. Appl. No. 17/321,501 (pp. 1-9).

* cited by examiner

SOCIAL GAME PLAY WITH GAMES OF CHANCE

CROSS-REFERENCE TO RELATED APPLICATIONS

This application is a continuation of U.S. application Ser. No. 13/801,171, filed Mar. 13, 2013, and entitled "SOCIAL GAMING," which is hereby incorporated herein by reference, and which in turn is a divisional of U.S. application Ser. No. 13/296,182, filed Nov. 14, 2011, and entitled "SOCIAL GAMING," which is hereby incorporated herein by reference, which in turn claims priority benefit of U.S. Provisional Application No. 61/413,477, filed Nov. 14, 2010, and entitled "Social Gaming," which is hereby incorporated herein by reference.

FIELD OF THE INVENTION

The present invention relates to games of chance. More particularly, the present invention relates to social game play when playing games of chance. Even more particularly, the present invention relates to using gaming machines for social game play when playing games of chance at a gaming establishment.

BACKGROUND OF THE INVENTION

Social networks in different forms are becoming exponentially popular, with most of them being slight variations on the well-known MySpace™ (http://www.myspace.com) or Facebook™ (http://www.facebook.com) models. For example, active membership in Facebook™, a popular social networking site, has greater than 500 million users, and comprises everyone from school children to grandparents. Such tools are generally used to post information that can be accessed by other registered users of the system. Unfortunately, the trend of social networking tools has solidified the notion of social networks as a web-page only paradigm, a virtual Rolodex that grows so big that the social network lacks context, and hence relevance.

Gaming establishments are constantly looking for different ways to increase gaming revenue and provide a more satisfying gaming experience for the player. Social networks may provide a social aspect for playing games of chance.

BRIEF SUMMARY

A system, apparatus, and method for establishing a social game between a gaming machine and at least one user are provided. In one embodiment, a social gaming system may have at least one gaming machine configured to play a game of chance and produce game information and a social gaming server configured to: (i) communicate with the at least one gaming machine; (ii) establish a remote gaming session between the gaming machine and at least one user device; and (iii) distribute at least a portion of the game information to the at least one user device.

In another embodiment, a social gaming server may have a social game session manager configured to establish a social game session between a gaming machine and at least one user device, acquire gaming information from the gaming machine, determine portions of gaming information to be distributed to the at least one user device, and initiate transfer of the portions of gaming information to the at least one user device.

In one embodiment, a method for distributing game information may include operating a game of chance on a gaming machine to produce game information, identifying at least one remote user, and distributing at least a portion of the game information from the game of chance to the at least one remote user.

In another embodiment, a method for managing social awards may include operating a game of chance on a gaming machine, determining whether a social award has been earned through playing the game of chance, generating the social award if the determining determines that a social award has been earned, determining if the social award is to be transferred to a remote recipient, and transferring the social award to the remote recipient if the determining determines that the social award is to be transferred to a remote recipient.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION

Embodiments are described herein in the context of social gaming. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with some embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A system, apparatus, and method for providing a social game environment in which players of gaming machines can interact with other users while playing a game on a gaming machine. The game played on the gaming machine can be referred to as a social game (or a social game session) since remote players can assist the player of the gaming machine in playing the game of chance, an associated social game component of the game of chance, or a separate social game (which can be a game of change or a non-game of chance). In general, the player of the gaming machine can gain assistance (e.g., participation or interaction) from other players that are not located at the gaming machine (i.e., remotely located from the gaming machine). The other players may be eligible to gain awards, points, or the like by assisting the player of the gaming machine. The other players can be referred to as at least one social gaming user.

Figure 1:
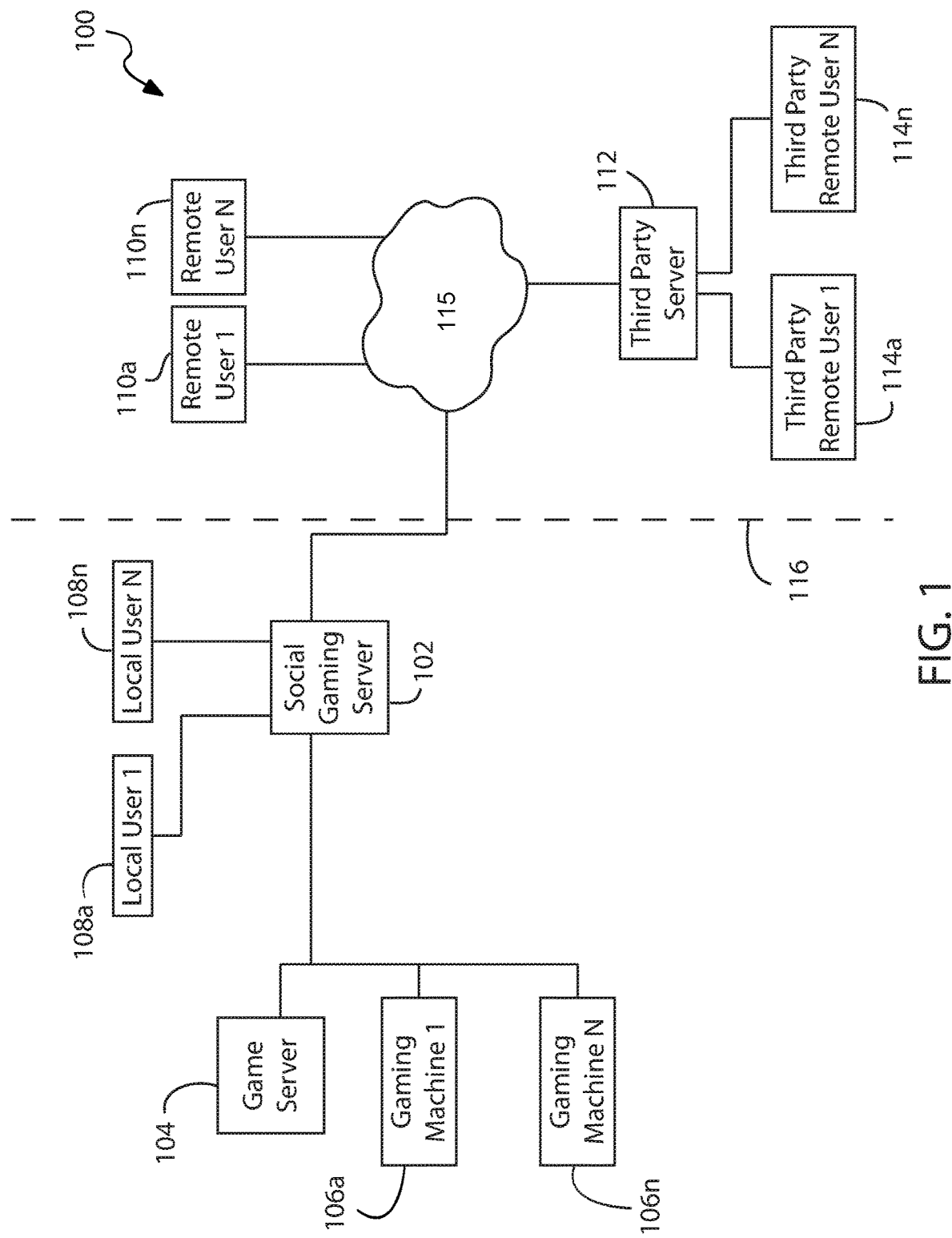
FIG. 1 illustrates an example social gaming system.

FIG. 1 illustrates an example social gaming system. The social gaming system 100 may include a game server 104, at least one gaming machine 106a-106n (where n is an integer), a social gaming server 102, and a third party server 112. The game server 104, the at least one gaming machine 106a-106n, and the social gaming server 102 may be within a local gaming environment. Example gaming environments may be a casino, grocery stores, gas stations, and any other establishment having gaming machines. The gaming environment can include a physical location for gaming and any servers, any gaming machines, and any devices connected to a network 115. For illustrative purposes only, line 116 divides the local gaming environment network from a non-gaming environment network. The local gaming environment network is to the left of the line 116 and the non-gaming environment network is to the right of the line 116.

Communication between the game server 104, the at least one gaming machine 106a-106n, the social gaming server 102, the third party server 112, the local users 108a-108n, and the remote users 110a-110n may be conducted through network 115 via any combination of wired networks, wireless communication technology, and cellular networks. A wired network can use Category 5 cable, Category 6 cable, fiber optic cable, coaxial cable or other cable types typically used for computer networks. Examples of wireless communications technology may include, but is not limited to, Wi-Fi and Bluetooth. Cellular networks may use Code division multiple access (CDMA), Global System for Mobile Communications (GSM), or any other common mobile network standards to transmit data at $2^{nd}$ generation (2G), $3^{rd}$ generation (3G), 4th generation (4G), or any other data transmission speeds.

The game server 104 may be any computing hardware typically used for network servers. The game server 104 may have a memory configured to store at least one game of chance and a processor configured to manage the game of chance. The game of chance could be reel-based slot games, video poker, video blackjack, electronic table game, lottery games, or any other games of chance. The game server 104 can be configured to communicate with the at least one gaming machine 106a-106n and the social gaming server 102.

The at least one gaming machine 106a-106n can be configured to play the game of chance, received from the game server 104, and produce game information. The at least one gaming machine 106a-106n may be a slot machine, mobile gaming device, electronic gaming table, electronic blackjack table, electronic roulette table, kiosk, interactive TV, tablet computer, or the like. In one embodiment, the at least one gaming machine 106a-106n may have a main display, a secondary display, a graphical user interface (GUI) displayed or presented on the main display or the secondary display, a ticket-in ticket-out (TITO) system, a bill acceptor, and a player tracking device as further illustrated and discussed in FIG. 9. A player may initiate a social game session using the GUI. The at least one gaming machine 106a-106n may be configured to communicate to other gaming machines and the game server 104.

The social gaming server 102 may have a processor. The processor can be any microprocessor, CPU, multi-core processor or chipset commonly used by network servers for computing. The processor can be configured to communicate with and manage a plurality of social gaming managers. The plurality of social gaming managers may include some or all of the following: a social game session manager, an authentication manager, a social contacts manager, a local social game manager, and a social awards manager as further illustrated and discussed with reference to FIGS. 2A and 2B.

The third party server 112 may be configured to store and manage non-gaming social games. The third party server 112 may authorize a third party remote user 114a-114n or a user device of the third party remote user 114a-114n and connect the third party remote user 114a-114n to the social gaming server 102 to participate in a social gaming. In one embodiment, the third party server can be any social networking server (e.g. Facebook™, MySpace™, LinkedIn™, Twitter™, and the like) and may receive at least a portion of the game information.

In one embodiment, at least one social gaming user can be a remote user 110a-110n. The remote user 110a-110n may be located in a geographical location that is physically separated from or away from the at least one gaming machine 106a-106n and/or the gaming environment. For example, the remote user 110a-110n may be at home and utilize a laptop computer configured to communicate directly with the social gaming server 102 through network 115.

In another embodiment, the at least one social gaming user can be a local user 108a-108n. The local user 108a-108n may be location within or on the premises of the gaming environment. For example, the local user 108a-108n may be located in a restaurant in the gaming environment and can participate in the social game session using a smart phone configured to communicate with the social gaming sever 102. In another example, the local user 108a-108n may be playing on another gaming machine 106a-106n while participating in a social game.

In yet another embodiment, the at least one social gaming user may be a third party remote user 114a-114n. The third party remote user 114a-114n may participate in a social game session via third party server 112. Third party server 112 may then be configured to communicate with the social gaming server 102 via network 115 and be configured to facilitate communication between the third party remote user 114a-114n and the social gaming server 102.

The at least one social gaming user may participant in a social game session using a user device. In one embodiment, the user device can be a computing device such as, but not limited to, a desktop computer, a laptop computer, a tablet computer, or a netbook computer. In another embodiment, the user device may be a portable electronic device such as a cell phone, a smart phone, a portable media player, a portable gaming device, a personal digital assistant or the like. In yet another embodiment, the user device may be another gaming machine.

Figure 2A:
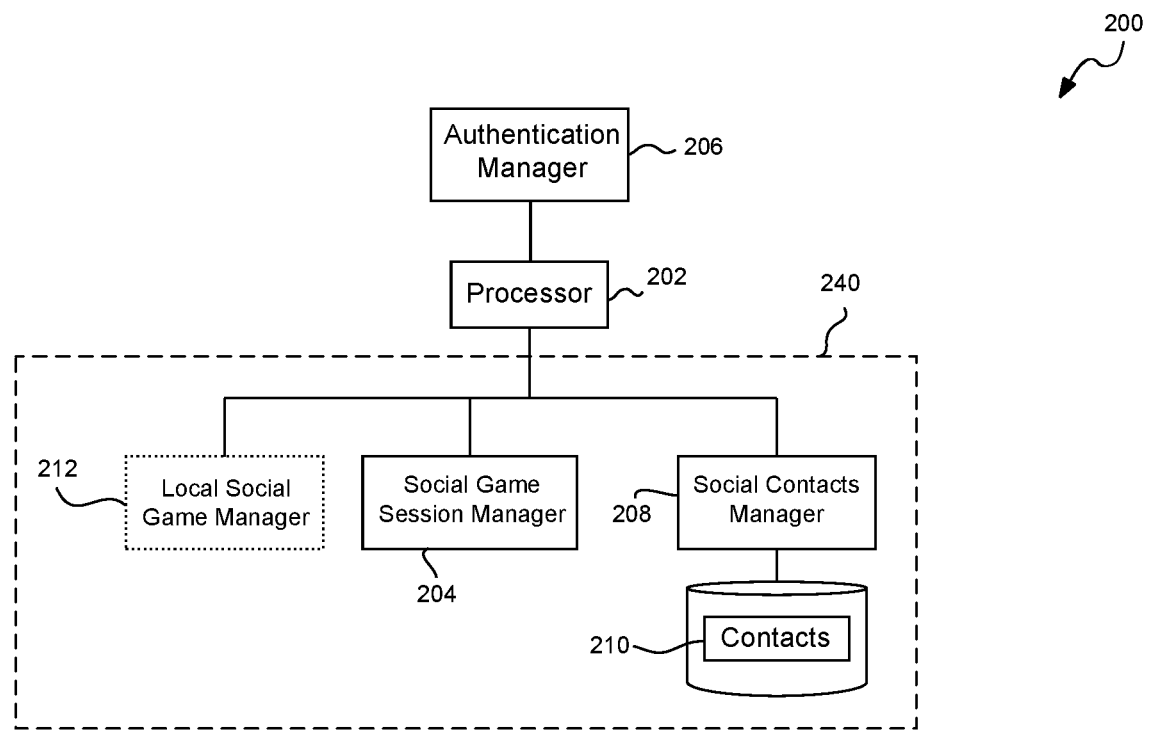
FIGS. 2A and 2B illustrate a block diagram of example embodiments of a social gaming server.

FIG. 2A is a block diagram of one embodiment of a social gaming server. The social gaming server 200 may be similar to gaming server 102 illustrated in FIG. 1. The social gaming server 200 may have a processor 202 configured to control the operations of the social gaming server 200. In one embodiment, processor 202 may communicate with and manage at least one social gaming manager 240. The at least one social gaming manager 240 may include one or more of the following: a social game session manager 204, an authentication manager 206, and a social contacts manager 208.

The social game session manager 204 may be configured to manage a social game session established between a gaming machine and at least one user device via the social gaming server 200. The social game session can enable the social gaming user of the at least one user device to receive current or real-time and/or past game information about a game of chance. The social game session may also enable the social gaming user of the at least one user device to remotely participate in or interact with the game of chance.

Social gaming server 200 may be configured to acquire gaming information from a gaming machine, such as gaming machines 106a-106n illustrated in FIG. 1. The gaming information can be generated by the gaming machine and/or the game server (such as game server 104 illustrated in FIG. 1) as the player plays the game of chance on the gaming machine. As the gaming information is generated, the gaming information can be simultaneously transmitted to and acquired by the social game server 200. The gaming information may then be stored, processed, and managed by the game session manager 204. The gaming information can include any game information generated from playing the game of chance such that the social game session manager 204 can reproduce the game of chance on a display of a user device. For example, the gaming information may include, but is not limited to, number of credits, total amount of time spent playing the gaming of chance at the gaming machine, notification of a win, loss, tie, push, and the like, amount won or lost, wager amount, award earned, notification of a remote input, pay table, and the like. The game information may also be specific to a type of the game of chance being played. For example, if the game of chance is an electronic card game, such as video poker or video blackjack, the game information can include, but is not limited to, cards held by the player, communal cards, and actions taken by the player such as hitting or drawing for new cards. If the game of chance is a slot game, the game information can include, but is not limited to, contents of the reels, lines being played, notification of lines won, and images on the reels.

The social game session manager 204 can be configured to determine at least one portion of game information to be distributed to the at least one user device. In one embodiment, the social game session manager 204 can determine the at least a portion of the game information to be distributed based upon a plurality of user preferences. The plurality of user preferences may be any configuration desired by a user that may be stored on the social gaming server 200, the social game session manager 204, or any other memory device or server device. The plurality of user preferences may be any specific preferences desired such as, the type of gaming information the user would like to see and when. For example, Bob may only want to know when Tom has earned a non-gaming award when playing a game on the gaming machine. When Tom earns a non-gaming award while playing the gamine of chance, the social game server 200 may transmit the gaming information about the non-gaming aware to Bob. However, the social game server 200 may not transmit the fact that Tom also won $100.00.

In another example, the social game session manager 204 may be configured to determine which gaming information is considered to be "significant". The significant event could be, for example, winning a jackpot, the player cashed out of the gaming machine, hitting a royal flush, entering a bonus game, and the like. In another example, the social game session manager 204 may determine to transmit all the gaming information.

In one embodiment, the gaming information may be transmitted from the social gaming server 200 to the users via any known methods, such as streaming the gaming information.

The authentication manager 206 may be configured to authenticate a user. In one embodiment, the authentication manager 206 may authenticate the user by confirming validity of a password, biometric identifier, personal identification number(s), or the like. Following authentication, the authentication manager 206 may signal the social game session manager 204 to establish the social game session between the gaming machine and the user device of the user. In another embodiment, a third party server, such as third party server 112 illustrated in FIG. 1, may authenticate the user by confirming validity of a password, biometric identifier, personal identification number(s), or the like. The third party server may then transmit an approved or disapproved notification to the social gaming sever 200.

If the user is authenticated, the authentication manager 206 may transmit an approval notification to the social game session manager 204. The social game session manager 204 may then establish a social game between the gaming machine and a user device of at least one social gaming user.

In one embodiment, the authentication manager 206 may be configured to authenticate the user device based upon an identifier, such as a MAC address, confirming validity of a key file (which may or may not be encrypted) stored on the user device, hashing and comparing contents of the key file to a record maintained by the authentication manager 206, or any other commonly used methods of verifying the validity of a data file. In yet another embodiment, the authentication manager 206 may authenticate the user device using a unique address, such as a short code or a web link.

The social contacts manager 208 may be configured to store and/or manage one or more social contacts for a player playing the game of chance on a gaming machine. In one embodiment, the one or more social contacts may be stored in a contacts database 210. In another embodiment, the one or more social contacts may be stored on a third party server, such as third party server 112 illustrated in FIG. 1. For example, the third party server may be a social networking server configured to store, manage, and associate contacts with the player playing the game of chance on the gaming machine. The social contacts manager may be configured to add contacts, delete contacts, search for contacts, block contacts, and other similar administrative functions as desired by the user. The social contacts manager 208 may be configured to populate a social contact list presented on a GUI of the gaming machine or user device.

The social game server 200 may optionally have a local social game manager 212. The local social game manager 212 may be configured to manage non-gaming social games. Non-gaming social games may be any type or kind of game that is not a game of chance utilizing a random number generator and/or any type of game where prizes are not monetary. For example, a non-gaming social game may be a "Hotel Management" simulation game, where different players can build and run a hotel.

Figure 2B:
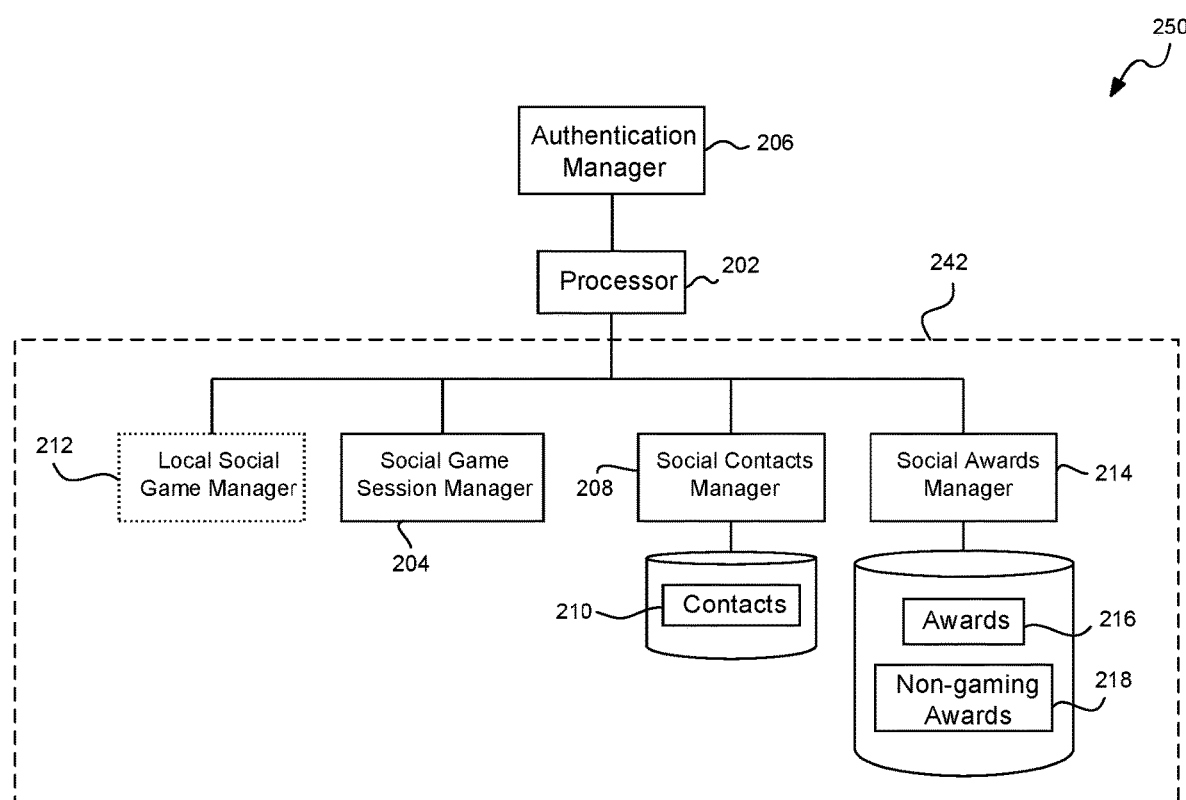

FIG. 2B illustrates a block diagram of another embodiment of a social gaming server. The social gaming server 250 may be similar to the social gaming server 200 illustrated in FIG. 2A, except that the at least one social gaming manager 242 may include a social awards manager 214. The social awards manager 214 may be configured to determine whether an award has been triggered or earned in a game of chance and the type of award won. The triggering event and the type of award won may be based on the type and theme of game played. For example, an award may be triggered for winning a particular round of the game of chance, winning a certain number of times over a predetermined period of time, winning a certain amount of credits in a particular round of the game of chance, winning a certain monetary amount, obtaining a royal flush, and the like.

In another embodiment, an award triggering event may be a loss. For example, an award may be triggered by losing a particular round of the game of chance, losing a certain number of times over a predetermined period of time, losing a certain amount of credits in a particular round of the game of chance, losing a certain total monetary amount, or the like.

In yet another embodiment, an award may be triggered by achieving or obtaining a particular outcome. For example, in a slot game, an award triggering event may be obtaining six cherry symbols on a plurality of reels without winning a payline. In another example, in a video poker game of chance, an award may be triggered by obtaining a pair of queens in five consecutive hands.

The social awards manager 214 can be configured to generate the award if an award triggering event has occurred. The award can be any type of gaming or non-gaming award and may be based on the type and theme of game. A gaming award may be, for example, a monetary award, at least one free spin, a multiplier, earning a plurality of points, triggering a bonus event, and the like. A non-gaming award can be, for example, a digital enhancement for the social gaming user interface on the user device and/or on the gaming machine. The digital enhancement can be a wallpaper, a background, a song, new avatar, a picture, any type of other visual and/or auditory aesthetic prizes, movie tickets, food coupons, and the like. The non-gaming award may also be a virtual good. The virtual good can be used in a non-gaming social game hosted by a third party server or the local social game manager 212 of the social gaming server 250. The social awards manager 214 may store the gaming awards in an awards database 216 and the non-gaming awards in a non-gaming awards database 218.

The social awards manager 214 can be configured to determine if the award is to be transferred to a remote recipient. In one embodiment, the social awards manager 214 can determine if the award is to be transferred if the social awards manager 214 receives a user transfer request to transfer the award to another player. The user transfer request can be made by the user currently in possession of the award. In another embodiment, the social awards manager 214 may receive a remote transfer request for the award by a social gaming user not in possession of the award. The social awards manager 214 may transmit the request to the user currently in possession of the award and await approval of the transfer request from the user currently in possession of the award. If the social awards manager 214 receives an approval for the transfer request, the social awards manager 214 may transfer the award to the social gaming user. The social awards manager 214 can be configured to modify ownership of the award entry in either the awards database 216 or the non-gaming awards database 218. If a denial for the transfer request is received by the social awards manager 214, then the social awards manager 214 determines not to transfer the award.

Figure 3:
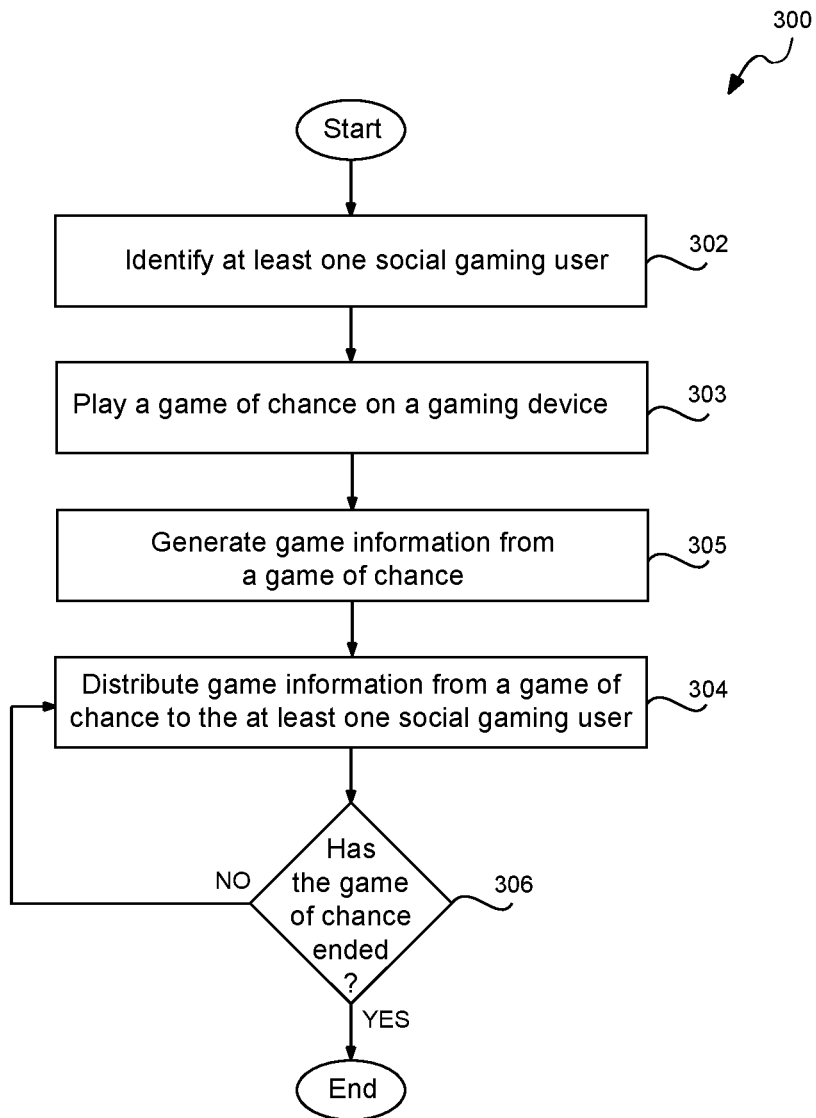
FIG. 3 illustrates a flow diagram of an example method for distributing game information.

FIG. 3 illustrates a flow diagram of an example method for distributing game information. A method for distributing at least a portion of game information 300 may be performed by a social gaming server such as social gaming server 102 illustrated in FIG. 1, social gaming server 200 illustrated in FIG. 2A, or social gaming server 250 illustrated in FIG. 2B. The gaming information may originate from a gaming machine located within a gaming environment, from a game server such as game server 104 illustrated in FIG. 1, or any other gaming server or machine.

The method of distributing at least a portion of game information 300 can begin by identifying at least one social gaming user at 302. In one embodiment, the social gaming server may identify the at least one social gaming user based upon player input received from a player playing a game of chance. Input can be performed on a gaming machine such as a portable or mobile gaming device, electronic gaming table, electronic blackjack table, electronic roulette table, kiosk, interactive television, tablet computer, or the like. For example, the player playing a game of chance may select at least one social gaming user from a social contact list as, for example, illustrated in FIGS. 10-13. In another example, the player may input information about the at least one social gaming user for storage in a contacts database (as illustrated in FIGS. 2A and 2B). The player input may consist of a name, a username, an alias, an email address, a phone number, an account number, an IP address or other similar information specific to a particular individual. The player input may then be transmitted to the social gaming server.

Once player input is received by the social gaming server, the social gaming server may, in one example, identify the at least one social gaming user from the selection by comparing the input to a list of contacts stored in the contacts database. In another embodiment, the input may be compared with a list of contacts in a third party server. The user input may be transmitted to the third party server which may compare the input with a list of contacts stored at the third party server.

A game of chance may be played on a gaming machine at 303. Game information may be generated for the game of chance at 305 as the player plays the game of chance. In one embodiment, game information may be generated from the gaming machine. In another embodiment, game information may be generated from a game server (as illustrated in FIG. 1). For example, the gaming information may include, but is not limited to, number of credits, total amount of time spent playing the gaming of chance at the gaming machine, notification of a win, loss, tie, push, and the like, amount won or lost, wager amount, award earned, notification of a remote input, pay table, and the like. The game information may also be specific to a type of the game of chance being played. For example, if the game of chance is an electronic card game, such as video poker or video blackjack, the game information can include, but is not limited to, cards held by the player, communal cards, and actions taken by the player such as hitting or drawing for new cards. If the game of chance is a slot game, the game information can include, but is not limited to, contents of the reels, lines being played, notification of lines won, and images on the reels.

As the game information is generated, the game information can be simultaneously transmitted to and acquired by the social game server (as illustrated in FIGS. 1, 2A, and 2B) for distribution to at least one social gaming user at 304. At least a portion of the gaming information may be distributed by any known method. In one example, at least a portion of the gaming information may be posted to the at least one social gaming user. The social game session manager may transfer the game information to a third party sever (as illustrated in FIG. 1). The third party server may be, for example, any known social gaming server or any other server accessible over a network. The third party server can post the gaming information to a webpage, a feed, a notification board, or the like. The at least one social gaming user can retrieve the game information from the webpage, the feed, the notification board, or the like.

In another embodiment, the at least a portion of the gaming information may be electronically transmitted to the at least one social gaming user via electronic mail. In yet another embodiment, the at least a portion of the gaming information may be streamed. Streaming results may result in a real time reproduction display of the game of chance. As action occurs in the game of chance, the real time reproduction display will mirror the display of the gaming machine. The streaming can be supplemented by any combination of textual, audio, or visual information.

A determination of whether the game of chance has ended is made at 306. The game of chance may end if the player decides to stop playing the game of chance. The game of chance also may end if no credits for playing the game of chance are left. If the game of chance has not ended, the at least a portion of the gaming information may continue to be distributed to the at least one social gaming user at 304.

Figure 4:
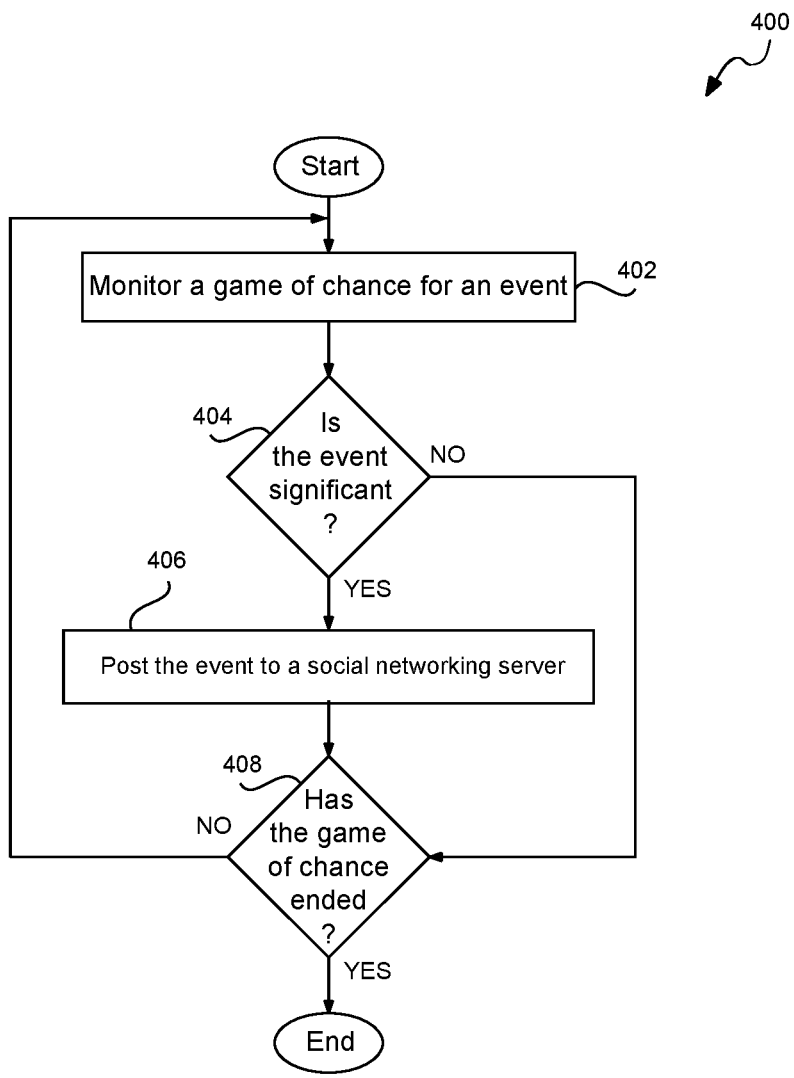
FIG. 4 illustrates a flow diagram of an example method for posting an event to a social networking server.

FIG. 4 illustrates a flow diagram of an example method for posting an event to a social networking server. A method for posting an event to a social networking server 400 can be performed by a social gaming server (as illustrated in FIGS. 2A and 2B). The method 400 may begin by monitoring a game of chance for an event at 402. In one embodiment, the monitoring may be performed by a social game session manager (as illustrated in FIGS. 2A and 2B) of the social gaming server. For example, as a player plays the game of chance, game information from the game of chance may be transmitted from a gaming machine to the social game session manager of the social gaming server. In another embodiment the gaming machine can transmit the game information to the game server. The game server can then transfer the game information to the social game session manager of the social gaming server. Upon receipt of the game information, the social game session manager may parse the game information for events. The event may be a win, a loss, an earned award, the player switching to a different game of chance, the player cashing out, the player placing a large wager, the player performing a game action such as spinning reels or doubling down, or any other activity that may occur while playing a game of chance.

If the event is "significant" at 404 the significant event may be posted or transmitted to a social networking server at 406. In one embodiment, the significant event could be, for example, winning a jackpot, the player cashed out of the gaming machine, hitting a royal flush, entering a bonus game, and the like. In another embodiment, the significance of the event can be determined by the player of the game of chance or at least one social gaming user. For example, the player or social gaming user may select specific events from a significant event list as what he or she considers to be significant.

The social networking server may be the social gaming server, a third party server, or any other server. The social networking server can post the information to a webpage, a feed, a notification board, or the like. The at least one social gaming user can then retrieve the information from the webpage, the feed, the notification board, or the like.

If the event is not significant at 404 or the event has been posted to the social networking server at 406, a determination of whether the game of chance has ended is made at 408. In one embodiment, the game of chance may end if the player decides to stop playing the game of chance. The game of chance also may end if there are no more credits to play the game of chance.

Figure 5:
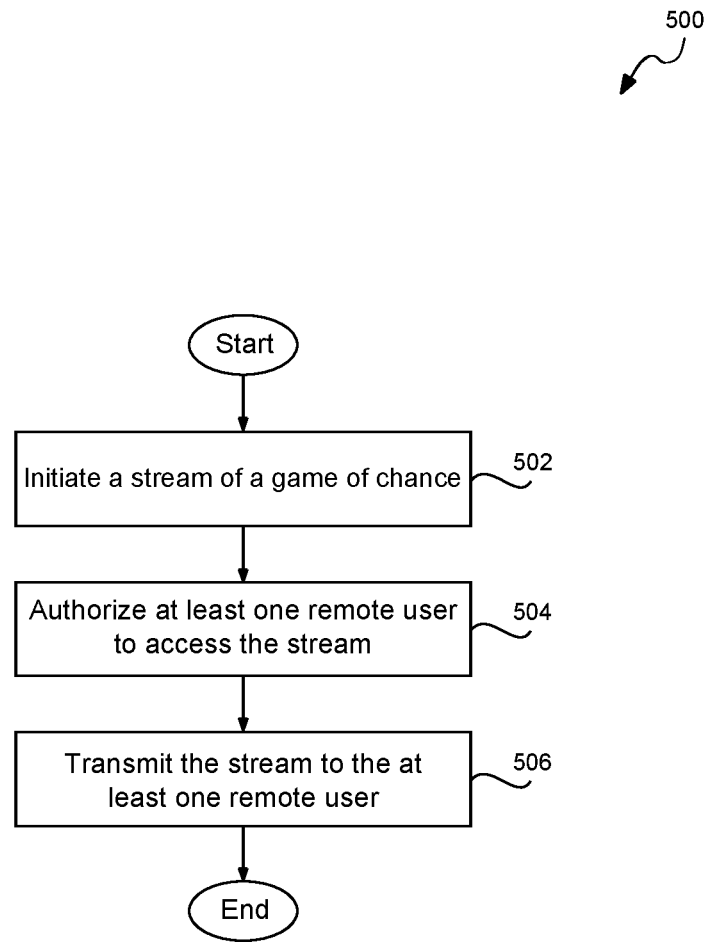
FIG. 5 illustrates a flow diagram of an example method for streaming at least a portion of gaming information to reproduce and present a game of chance on a display.

FIG. 5 illustrates a flow diagram of an example method for streaming at least a portion of gaming information to reproduce and present a game of chance on a display. The method 500 may be performed by the social gaming server (as illustrated in FIGS. 1, 2A, and 2B). A streaming of the game of chance may be initiated at 502. In one embodiment, the social gaming server may generate the gaming information for a game of chance. Once generated, the gaming information may be streamed to reproduce the game of chance on a display of a user device. In one embodiment, the stream may be initiated when a player begins to play the game of chance. The game of chance may be played on any type of gaming machine, portable or mobile gaming device, electronic gaming table, electronic blackjack table, electronic roulette table, kiosk, interactive TV, tablet computer, or the like. In another embodiment, the streaming of the game of chance may be initiated following receipt of an input by the player playing the game of chance to begin streaming. For example, the player may initiate the streaming of the game of chance by selecting a streaming option on the GUI.

The streaming of the gaming information may result in a real time reproduction of the game of chance on a display of a user device. As activity occurs as the player plays the game of chance, gaming information is generated whereby at least a portion of the game information may be streamed to a user device of at least one social gaming user. When the at least a portion of the gaming information is streamed to the at least one social gaming user, everything presented on the gaming machine may be reproduced and instantiated on a display of a user device of the at least one social gaming user.

In one embodiment, the at least a portion of the gaming information may be transmitted via a video feed. A camera positioned on the gaming machine may capture the activity of the game of chance in the video feed. The video feed can be encoded and prepared for streaming using any codec or technology commonly used to stream video over a network such as, but not limited to, Flash video and HTML 5. In another embodiment, the at least a portion of the gaming information may be transmitted via a digitally animated recreation of the game of chance. The streaming of the at least a portion of the gaming information may include any combination of textual, audio, or visual information.

At least one remote user may be authorized to access the stream at 504. The at least one remote user may be a social contact associated with the player playing the game of chance. In one embodiment, the at least one remote user may be stored in a contacts database maintained by a social contacts manager of the social gaming server (as illustrated in FIGS. 2A and 2B). The social gaming server may verify or authenticate the at least one remote user by comparing the at least one remote user to a list of social contacts in the contacts database.

In another example, the at least one remote user may be compared to a list of contact stored in a third party server. For example, the third party server can be any social networking server that manages contacts. The social gaming server can transmit a verification request to the third party server. A confirmation or non-confirmation may be transmitted to the social networking server from the third party server. Upon receipt of a confirmation or verification from the third party server, the social gaming server may authorize the at least one remote server to access the stream at 504.

In another embodiment, the at least one remote user need not be a social contact and may be authorized to access the stream via an identifier. The identifier can be a password, personal identification number (PIN), code, key file, or other similar form of identification or identifier. For example, if remote player A is sitting next to player B paying a game of chance and player A would like to view Player B's game, Player A may transmit a request to view Player B's game of chance to the social gaming server. The social gaming server can transmit a request for identification to the at least one remote user via electronic mail, text message, phone call, or any other identification and/or verification methods. For example, the social gaming server may transmit a request for Player B's player tracking number and PIN. Player B may input and transmit the information to the social gaming server. The social gaming server may then compare and/or verify Player B's information with information stored in the social gaming server, player tracking server, or any other server or database.

In still another embodiment, the identifier can also be a unique shortcode address or a unique URL. The unique shortcode address or the unique URL may be generated by the social gaming server. The social gaming server can transmit the unique shortcode address or the unique URL to a phone number, an email address, or the like, provided by the player. Upon receipt of the identifier, the at least one remote user may access the stream of the game of chance using the identifier. In other words, at least a portion of the gaming information may be streamed to a user device of the at least one remote user when the at least one remote user accesses the identifier.

Figure 6:
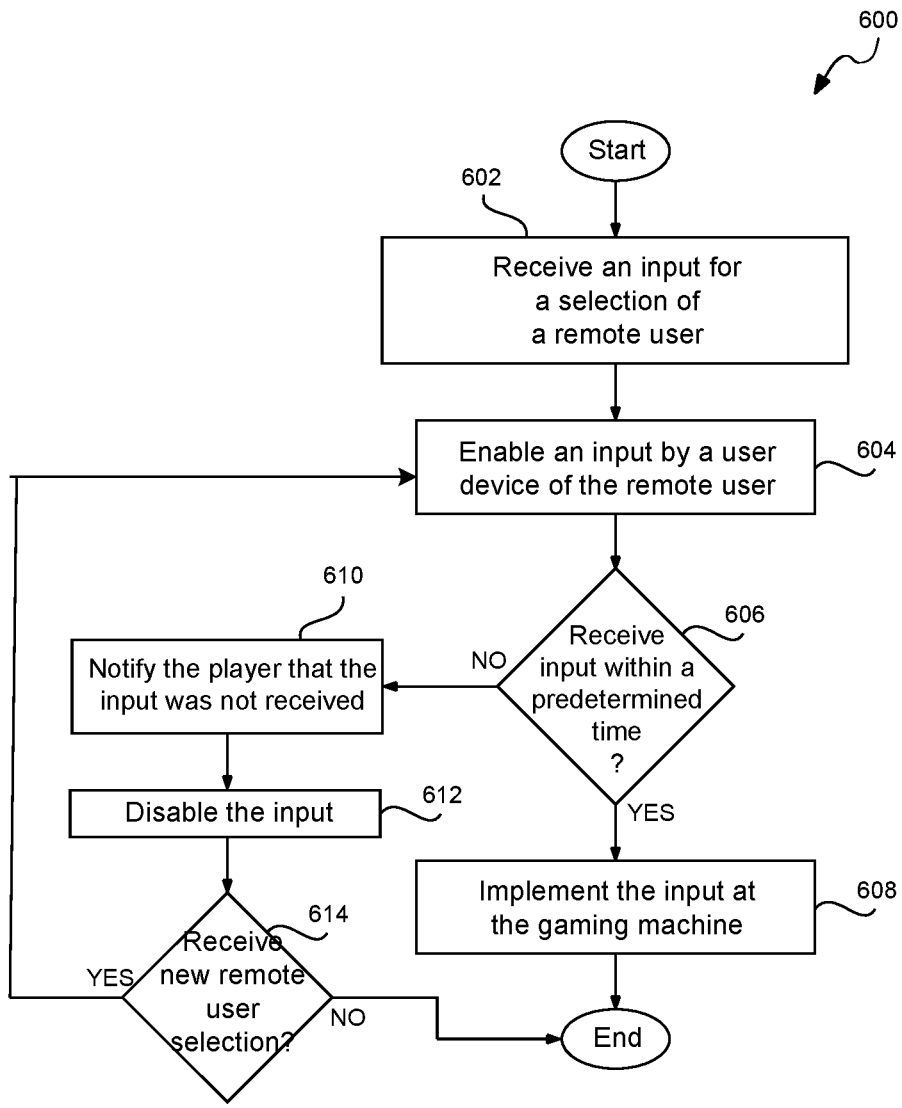
FIG. 6 illustrates a flow diagram of an example method for selecting a remote user.

FIG. 6 illustrates a flow diagram of an example method for selecting a remote user. The method 600 can be performed by the social gaming server (as illustrated in FIGS. 1-2) or any other server. An input for a selection of a remote user may be received at 600. The remote user may be any social gaming user as described above such as the local user, remote user, or third party user as illustrated in FIG. 1. The remote user may be selected to participate or interact in a game of chance.

The input for a selection of a remote user may be made from a social contact list (illustrated in FIGS. 10-13) presented or displayed on a GUI of the gaming machine. The gaming machine can transmit the input to the social gaming server, game server, or any other server. In another embodiment, the input may be a username, an alias, an email address, a phone number, or some other identifier that identifies the remote user.

Once the input for a selection of a remote user is received at 602, input by a user device of the remote user may be enabled at 604. Enabling the input may allow the remote user to participate, interact, and/or observe the game of chance. The input may be based on the type and theme of game. For example, by enabling input from the user device, the remote user may participate by spinning a bonus spin in a social gaming session. In another example, enabling input from the user device may allow the remote user to "hit", "double down", or "stay" in a blackjack social gaming session.

A determination is then made as to whether input is received from the remote user within a predetermined period of time at 606. The predetermined period of time may be set by the social gaming server, the player, or any other device or person. If input from the remote user is received within a predetermined period of time at 606, the input may be implemented at the gaming machine at 608. For example, if the remote user participates by spinning a bonus spin, the reels may be presented as spinning on the gaming machine. In another example, if the input received from the remote user is a "hit" for a video blackjack game of chance, the player may receive another card in the video blackjack game. In another example, if the game of chance is video poker, the input received from the remote user may be to draw at least one card. Thus, an additional card may be provided and displayed on the gaming machine.

If no input is received from the remote user at 606, the player may be notified that no input was received at 610, the input may be disabled at 612, and a determination may be made as to whether a new remote user selection was received at 614. In one embodiment, the player can receive a notification, such as an alert, a popup, a message, or any other form of notification, on a GUI of the gaming machine. In another embodiment the notification may occur on a user device of the player such as a text message. The notification may contain any combination of text, graphics, symbols, or indicia to notify the player that no input was received from the remote user. If a new remote user selection was received at 614, input for the user device of the remote user may be enabled at 604.

Figure 7:
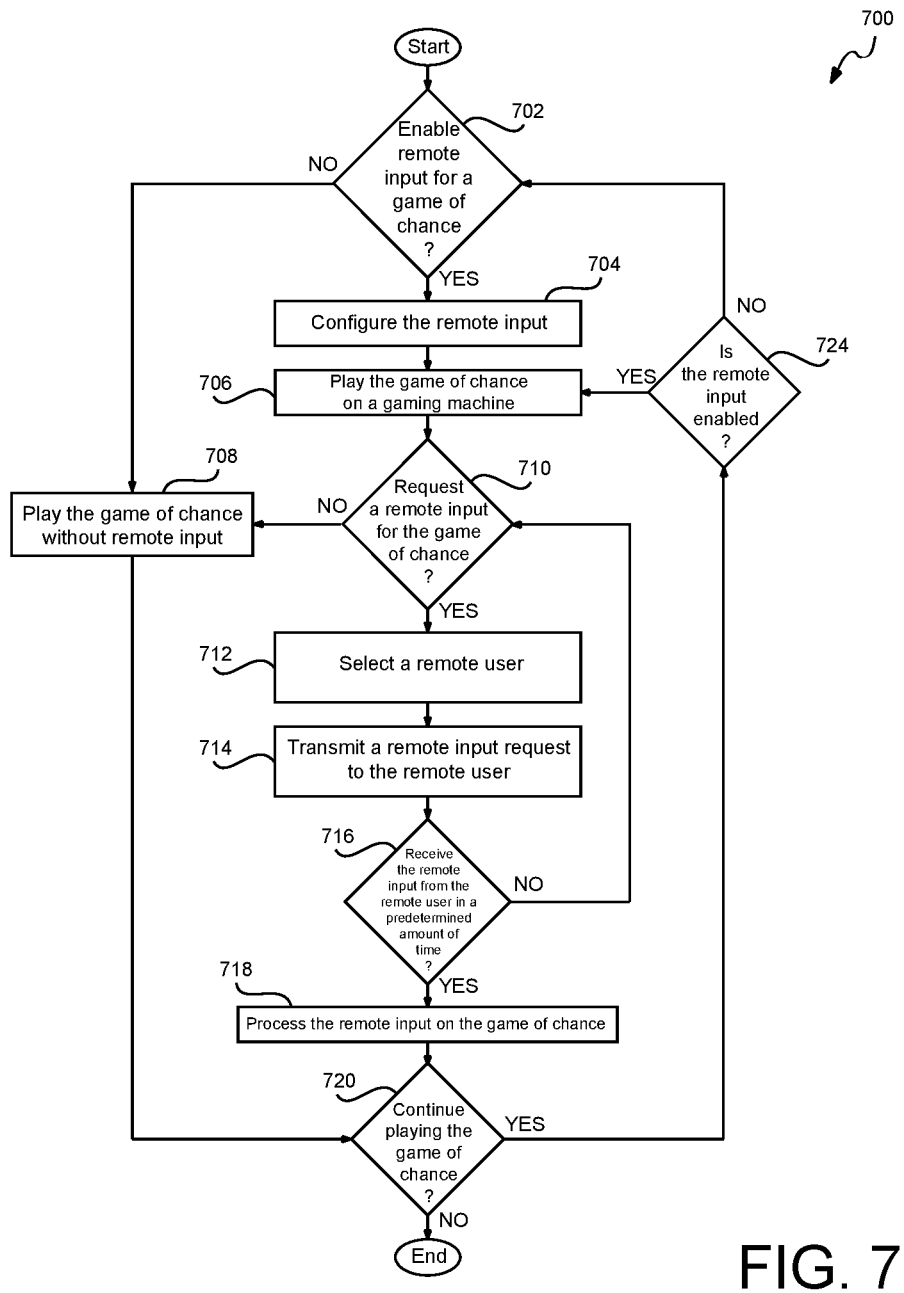
FIG. 7 illustrates a flow diagram of an example method for playing a game of chance with remote participation.

FIG. 7 illustrates a flow diagram of an example method for playing a game of chance with remote participation. A game of chance may be played on, for example, a gaming machine. The gaming machine may be a slot machine, mobile gaming device, electronic gaming table, electronic blackjack table, electronic roulette table, kiosk, interactive television, tablet computer, or the like. The method 700 may begin with a determination of whether a remote input or participation for a game of chance should be enabled at 702. In one embodiment, the gaming machine may enable the remote input by prompting the player to enable the remote input using the GUI. The gaming machine may then await for confirmation of the remote input from a remote user or at least one social gaming user. In another embodiment, the gaming machine may not have to prompt the user. The gaming machine can enable the remote input upon receipt of a remote input enablement request from the player without the user being prompted.

If it is determined the remote input should be enabled 702, the remote input can be configured at 704. The configuring may customize what remote input is available and tailor the remote input to a type of the game of chance. For example, if the game of chance is video blackjack, the remote input may be configured to limit the remote input to a blackjack action such as hit, stand, double down, split, or other actions associated with a game of blackjack. Configuring the remote input may also initiate a steaming of the gaming information to a user device as discussed above with reference to FIG. 5.

The player may play the game of chance on a gaming machine at 706. As the player plays the game a chance, a determination may be made as to whether a request for remote input for the game of chance be made at 710. In other words, as the player plays the game of chance, events may occur whereby the player would like participation or help from at least one social gaming user. In one embodiment, the player may request that a social gaming user assist or participate in playing the game of chance. In another embodiment, the gaming machine may prompt and ask the player whether he or she would like to allow others to assist in playing the game of chance. The gaming machine can offer the player the option to request the remote input for every gaming action, for a random gaming action, or for a predetermined gaming action. The player can accept or deny the remote input request prompt.

If it is determined that the remote input for the game of chance is requested at 710, a remote user may be selected at 712 to participate in the game of chance. In one embodiment, the remote user may be at least one social gaming user stored in a contacts database (as illustrated in FIGS. 2A and 2B). The player can make a selection of the remote user in a social contact list presented on a GUI (as illustrated in FIGS. 10-13). In another embodiment, the player can select the remote user by entering a username, an alias, an email address, a phone number, or some other identifier that identifies the remote user.

A remote input request may then be transmitted to the remote user at 714. The remote user may receive the remote input request on a user device such as a computing device, a portable electronic device, or another gaming machine. The remote user may then deny or accept the remote input request.

If remote input from the remote user is received within a predetermined period of time at 716, the remote input may be processed and used to play the game of chance at 718. In one embodiment, the remote input may be an acceptance of the remote input request transmitted at 714. In another embodiment, the remote input may be an action to play the game of chance.

For example, if the game of chance is a slot game, the remote input requested may be to initiate a free spin. In another example, if the game of chance is video blackjack, the remote input requested can be to hit, stay, or double down. The remote input may be any input to advance the game of chance.

If no input from the remote user is received within a predetermined period of time at 716, another determination may be made as to whether the player would like to request remote input for the game of chance at 710.

A determination may be made as to whether playing the game of chance is to continue at 720. The game of chance may continue if the player makes another wager, if the player won a bonus game, if additional bonus awards were won, and the like. Another determination of whether the remote input is enabled is made at 724.

Figure 8:
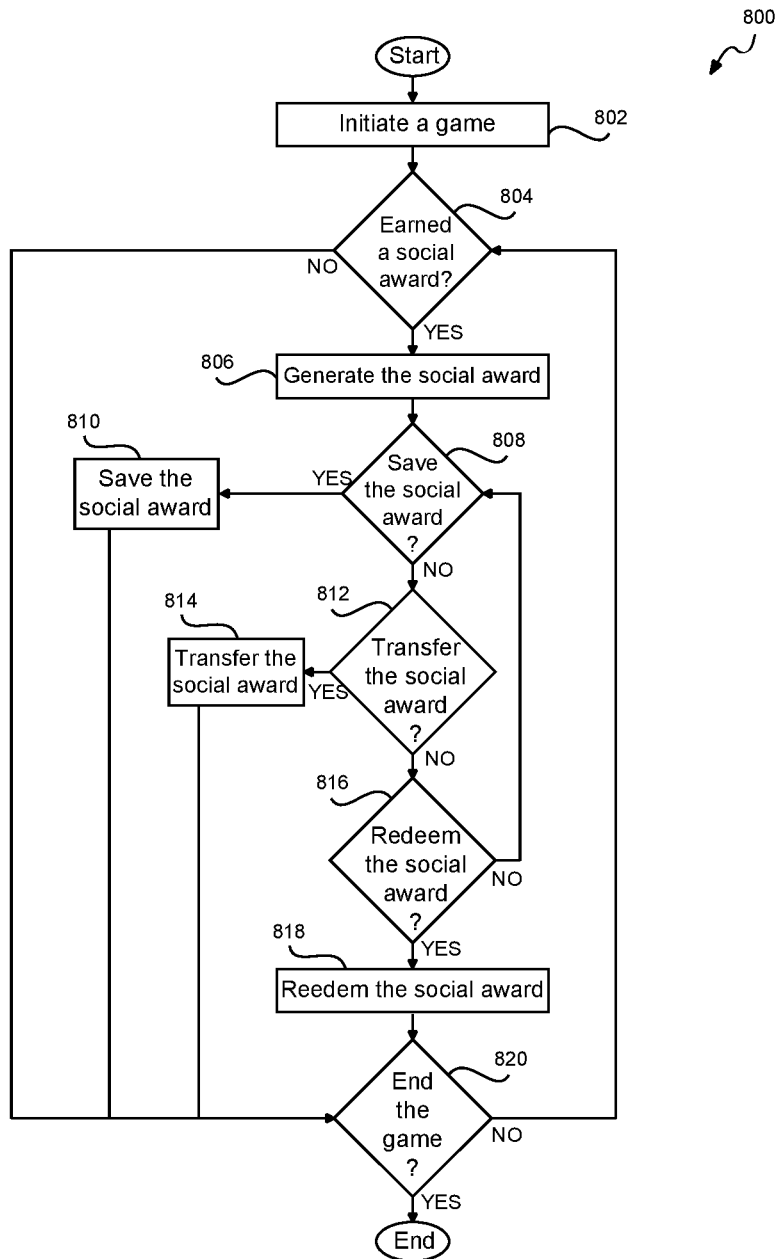
FIG. 8 illustrates a flow diagram of an example method for managing social awards.

FIG. 8 illustrates a flow diagram of an example method for managing social awards. The method 800 may begin by initiating a game at 802. In one embodiment the game is a game of chance. The game of chance can be any type of primary game of chance such as reel-based slot games, video poker, video blackjack, lottery games, electronic table games, or any other games of chance. The game of chance may be initiated on a gaming machine following receipt of a wager from a player. In another embodiment, the game is a non-gaming social game. The non-gaming social game may be hosted by a third party server, a local social game manager of a social gaming server (as illustrated in FIGS. 2A and 2B), or any other server capable of hosting and managing a non-gaming social game. The non-gaming social game may initiated upon accessing or logging into the third party server, a local social game manager, or any other server capable of hosting and managing a non-gaming social game.

Once initiated, a determination is made as to whether a social award is earned at 804. A social award may be earned by any known award triggering events based on the type or theme of game. For example, an award may be triggered for winning a particular game session, winning a certain number of times over a predetermined period of time, winning a certain amount of credits in a particular round of the game, winning a certain monetary amount, achieving a certain game pattern, achieving a free bonus round, winning a certain total monetary amount, obtaining a royal flush, or the like.

In another embodiment, an award triggering event may be a loss. For example, an award may be triggered by losing a particular round of the game of chance, losing a certain number of times over a predetermined period of time, losing a certain amount of credits in a particular round of the game of chance, losing a certain total monetary amount, or the like.

In yet another embodiment, an award may be triggered by achieving or obtaining a particular outcome. For example, in a slot game, an award triggering event may be obtaining six cherry symbols on a plurality of reels without winning a pay line. In another example, in a video poker game of chance, an award may be triggered by obtaining a pair of queens in five consecutive hands.

If a social award is earned at 804, the social award may be generated at 806. In one embodiment, a social awards manager (as illustrated in 2B) may be configured to generate the type of social award won. The award can be any type of gaming or non-gaming award. A gaming award may be, for example, a monetary award, at least one free spin, a multiplier, earning a plurality of points, triggering a bonus event, and the like. A non-gaming award can be, for example, a digital enhancement for the social gaming user interface on the user device and/or on the gaming machine. The digital enhancement can be a wallpaper, a background, a song, new avatar, a picture, any type of other visual and/or auditory aesthetic prizes, movie tickets, food coupons, and the like. The non-gaming award may also be a virtual good. The virtual good can be used in a non-gaming social game hosted by a third party server or the local social game manager of the social gaming server. The social awards manager may store the gaming awards in an awards database \and the non-gaming awards in a non-gaming awards database.

A determination may be made to save the social award at 808, transfer the social award at 812, or redeem the social award at 816. If the player would like to save and keep the social award, the social award may be saved at 810. In one embodiment, the social award may be saved in an awards database or non-gaming awards database (as illustrated in FIG. 2B) based upon the type of award. In another embodiment, the social award may be saved in a third party server (as illustrated in FIG. 1). When saved, the social award may be associated with the player.

If the social award is not saved at 808, the social award may be transferred at 812. In one embodiment, the social awards manager can be configured to determine if the award is to be transferred to a remote recipient. In one embodiment, the social awards manager can determine if the award is to be transferred if the social awards manager receives a user transfer request to transfer the award to another player. The user transfer request can be made by the user currently in possession of the award. In another embodiment, the social awards manager may receive a remote transfer request for the award by a social gaming user not in possession of the award. The social awards manager may transmit the request to the user currently in possession of the award and await approval of the transfer request from the user currently in possession of the award. If the social awards manager receives an approval for the transfer request, the social awards manager may transfer the award to the social gaming user at 814. The social awards manager can be configured to modify ownership of the award entry in either the awards database or the non-gaming awards database. If a denial for the transfer request is received by the social awards manager, then the social awards manager determines not to transfer the award at 812.

When the social award is not transferred at 812, a determination is made whether to redeem the social award at 816. In one embodiment, the social awards manager can be configured to determine if the award is to be redeemed. For example, the player or at least one social gaming user may be prompted to redeem the social award or not. The player or at least one social gaming user may then deny or accept the prompt. If an acceptance to redeem the social gaming award is received at 816, the social award may be redeemed at 818. If a denial to redeem the social gaming award is received at 816, the determination as to whether to save the social award at 808 may be repeated.

Once the social award is redeemed at 818, a determination as to whether to end the game may be made at 820. The game may end if the player decides to stop playing the game, no credits remain, the game ends, or the like.

Figure 9:
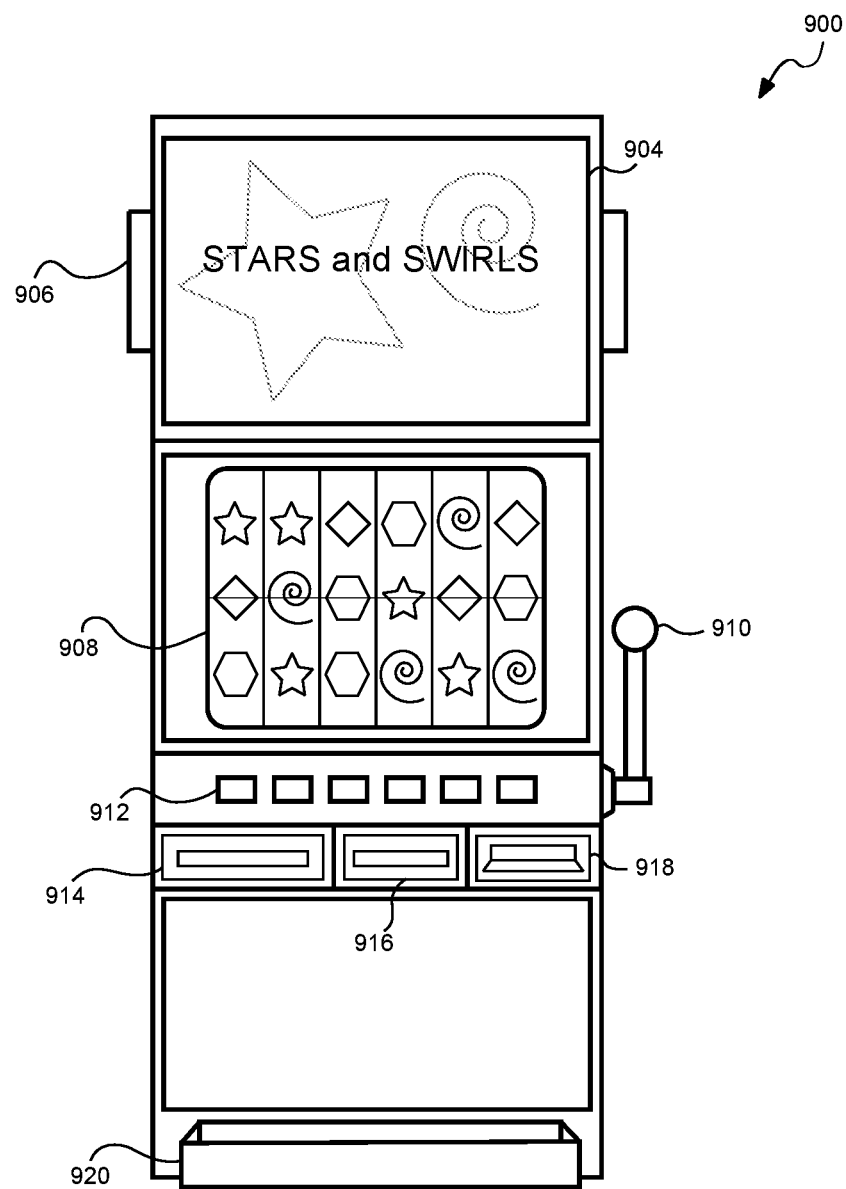
FIG. 9 illustrates a front view of an example gaming machine.

FIG. 9 illustrates a front view of an example gaming machine. Although the example gaming machine is illustrated as a slot machine, this is not intended to be limiting as the gaming machine may be a slot machine, mobile gaming device, electronic gaming table, electronic blackjack table, electronic roulette table, kiosk, interactive television, tablet computer, or the like. A gaming machine 900 may have a main display 908. The main display 908 may display any type of primary game of chance upon receipt of a wager from a player. For example, the main display 908 may display reel-based slot games, video poker, video blackjack, lottery games, or any other games of chance. In one embodiment, the main display 908 may display other types of text and graphics, including videos, pay tables, advertisements, secondary games, bonus games, player tracking information, announcements, or any other type of text and graphic.

The gaming machine 900 may have a player interface to play the primary game of chance and interact with the social gaming interface. In one embodiment, the player interface may include any type of actuating device such as buttons 912 or a lever 910. In another embodiment, the main display 908 may be the player interface. For example, the player interface may be a touch screen display configured to present a GUI and receive an input from the player. The player interface may be any type of input mechanism capable of allowing a player to select options, play the primary game of chance, play a bonus game, or enter any other player input. For example, pushing a button 912 or pulling a lever 910 may prompt the gaming machine 900 to begin a spin of a reel in a slot game to play a primary game of chance. In another example, a player may use the touch screen display to enter player account information. In yet another example, a player can use the touch screen display to select a social contact to remotely participate in a game of chance. The gaming machine 900 may also have speakers 906, lights, or other output devices.

The gaming machine 900 may also have a TITO (Ticket In, Ticket Out) system. TITO uses tickets encoded with monetary amounts, which can be converted into credits to be played in the gaming machine 900 when inserted into the gaming machine 900. The gaming machine 900 may have a bill acceptor 918 configured to receive the tickets. The gaming machine 900 may also have a ticket printer 914 configured to print out similar tickets encoded with the amount of credits remaining on the gaming machine 900 when the player desires to no longer play the gaming machine 900 and cash out.

The bill acceptor 918 may also be configured to receive currency, for example paper bills. The gaming machine 900 may also have a mechanism to accept currency in other forms such as coins, vouchers, smart cards, electronic funds, and the like. The currency can then be converted into credits to be played on the gaming machine 900. The gaming machine 900 may have a credit dispenser 920 where the credits on the gaming machine 900 can be cashed out when the player desires to no longer play the gaming machine 900.

The gaming machine 900 may have a player tracking device 916 configured to receive a player loyalty card. Casinos may issue players a player loyalty card for player tracking and rewarding purposes. The player loyalty card may be associated with a player account. Player account data may be stored on a network server (e.g. a player tracking server), which may be on a network database server configured to communicate with the gaming machines in the casino. The network may be a client-server network, a peer-to-peer network, a wired or wireless network, a wide area network (WAN), a local area network (LAN), or any other type of network. The player may insert his or her player loyalty card into the player tracking device 916 to log into the player's account. Data about the player's play, such as outcomes, bet amounts, time played, or any other type of information, may be saved over the network to a non-volatile memory at a player tracking server or any other network server. The player's account may be also be used to associate the player with the at least one social gaming user, social awards, and any other data or information.

The gaming machine 900 can have a secondary display 904. The secondary display 904 may also display other text and graphics, including videos, pay tables, advertisements, secondary games, bonus games, player tracking information, announcements, or any other type of text and graphic. The secondary display 904 can potentially display any type of game of chance such as reel-based slot games, video poker, video blackjack, lottery games, secondary games of chance or any other type of known games of chance. The secondary display 904 can be a liquid crystal display screen, cathode ray tube monitor, projection, organic light-emitting diode screen or any other type of display device.

Figure 10:
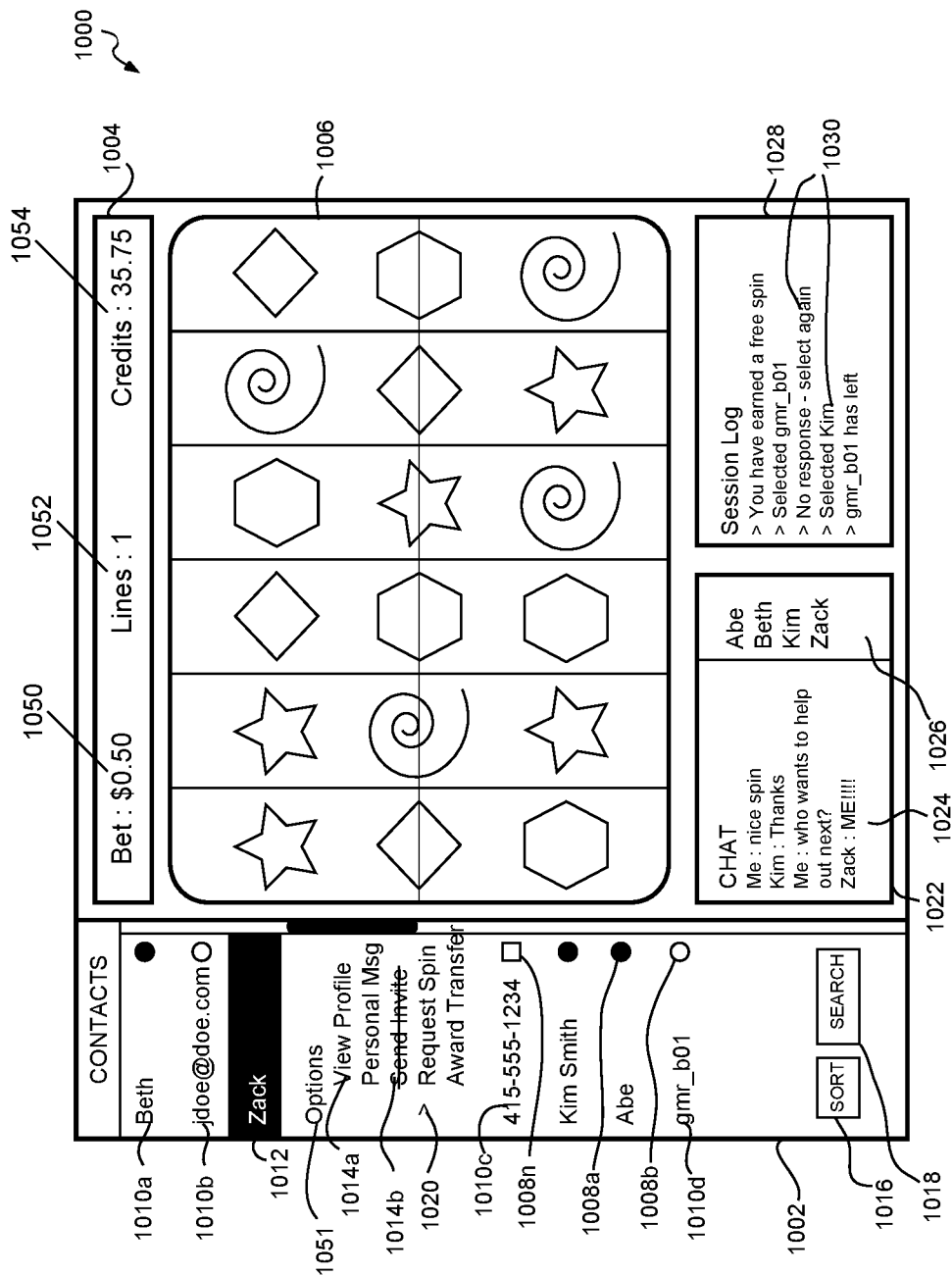
FIG. 10 illustrates an example graphical user interface.

FIG. 10 illustrates an example graphical user interface. The GUI 1000 may be presented on any display of a gaming machine, such as a main display or a secondary display of a slot machine (as illustrated in FIG. 9), display of a mobile gaming device, or the like. The GUI 1000 may include a game of chance window 1006, a game of chance information window 1004, a social contact list 1002, a social gaming communications window 1022, and a social gaming log 1028. The social gaming interface 1000 may visualize a social game session for a player and provide the player with information regarding the social game session, a game of chance, and a plurality of social contacts. The player can interact with the social gaming interface 1000 using a player interface of the gaming machine. In one embodiment, the player interface can be at least one button, a keyboard, or any similar input mechanism. In another embodiment, the player interface may be a touch screen display configured to receive input from the player.

The game of chance window 1006 can display any type of game of chance upon receipt of a wager from the player. For example, the game of chance window 1006 may display reel-based slot games, video poker, video blackjack, lottery games, electronic table games, or any other types or themes of games of chance. The game of chance information window 1004 can display information related to the game of chance. The information displayed in the game of chance information window 1004 can include a wager amount 1050, total credits 1054, pay lines 1052, or any other gamin information. In one embodiment, the game of chance information window 1004 may be a standalone window as illustrated in FIG. 10. In another embodiment, the game of chance information window 1004 can be integrated into the game of chance window 1006.

The social contact list 1002 can display and provide the player access to a plurality of social contacts. In other words, the social contact list 1002 may provide a list of at least one social gaming user associated with the player. The listing of at least one social gaming user may be obtained from, for example, the social contacts manager (illustrated in FIGS. 2A and 2B), a third party server (illustrated in FIG. 1), or any or server or database used to store a contact list.

The social contact list 1002 may include a plurality of controls configured to manipulate the social contact list 1002. In one embodiment, the plurality of controls can be a sort button 1016 and a search button 1018. In another embodiment, the actuation of the sort button 1016 may order the plurality of social contacts. For example, pressing the sort button 1016 can sort the plurality of social contacts alphabetically, by type, by groups, by player preferences, availability, or the like. The search button 1018 may allow the player to search for a particular social gaming user using any known searching methods. Although FIG. 10 is illustrated only with the sort button 1016 and the search button 1018, this is not intended to be limiting as the social contact list 1002 may have other controls such as a joystick, speaker and microphone for audio interaction, and the like.

The plurality of social contacts can be represented by alpha-numeric text such as, but not limited to, name 1010a, email address 1010b, phone number 1010c, or an alias 1010d. Although the plurality of social contacts are illustrated in FIG. 10 as being represented by alpha-numeric text, this is not intended to be limiting as the plurality of social contacts in the social contact list 1002 may also be represented by pictures, icons, unique identifier, or other indicia. Each of the plurality of social contacts can be associated with a social contact status indicator 1008. Although the social contact status indicators 1008a-n are illustrated as black and white geometric shapes, this is for illustrative purposes only and not intended to be limiting. For example, hashed lines, different colors, different shapes, and the like may be presented. In one embodiment, a filled-in circular indicator 1008a can represent a particular social contact is active in the social game session hosted by the player. In another embodiment, an empty circular indicator 1008b may represent a particular social contact has connected to a social gaming system, but is not active in the social game session hosted by the player. In yet another embodiment, an empty square indicator 1008c can represent a particular social contact has not connected to the social gaming system and is not active in the social game session hosted by the player.

The social contact list 1002 may include a plurality of social contact options. The plurality of social contact options may be configured to allow the player to perform a variety of social gaming actions such as viewing a social contact profile, messaging a social contact, inviting a social contact to join a social game, requesting a remote participation input, transferring a social gaming award, and the like. In one embodiment, the plurality of social contact options 1050 may be arranged in a menu listing the various options and include an option indicator 1020 to indicate which social contact option in the menu has been selected by the player. The option indicator 1020 may be, but is not limited to, an arrowhead as illustrated in FIG. 10. Other shapes, indicators, and the like may be used. Available social contact option may be indicated by text formatting, colors, or other indicia. For example, in the social contact option 1050, a profile may be viewed for Zack as indicated by "View Profile" 1014a. Unavailable social contact options may be indicated by text formatting, colors, or other indicia different from that of available social contact options. For example, a strike-through 1014b can indicate inviting the social contact Zack is unavailable to the player.

In one embodiment, the social contact options 1050 may appear in the social contact list 1002 upon receipt of an input on the gaming machine. For example, the input may be selection of an "option" indicator presented on the GUI. In another example, the input may be a selection of one of the at least one social gaming users. The input may be a tap, double tap, press and hold, swipe, slide, or other input.

The social gaming communications window 1022 can include a session participant area 1026 and a communications area 1024. The session participant area 1026 may contain a list of all contacts participating in the social game session. In one embodiment, the contacts may be listed using alpha-numeric text, as illustrated in FIG. 10. In another embodiment, the contacts can be listed using visual indicators such as pictures, logos, icons, graphics, real-time video feed and other static and dynamic visual indicia or methods. The communications area 1024 may convey communication between the contacts participating in the social game session. In one embodiment, the communication may be text based and the communications area 1024 can be similar to instant messaging or chat rooms. In another embodiment the communication can be video chat based. In one embodiment, if the communication is video chat based, the session participant area 1026 and the communications area 1024 can be merged in one display area. The social gaming communications window 1022 may then contain a plurality of sections, each section contain a real-time video feed for each contact. Audio from the video chat based communication may play through at least one gaming machine speaker. In one embodiment, the video chat based communication can be supplemented with text transcription. The text transcription may be similar to known instant messaging or chat rooms.

The social gaming log 1028 may display a plurality of events 1030 from a social game session. The plurality of events 1030 can include, but is not limited to, an entrance into the social game session by a contact participating in the social game session, an exit from the social game session by a contact participating in the social game session, a selection of one of the contacts for remote participation, a result of the remote participation, a procurement of an award, and the like. In one embodiment, the social gaming log 1028 may be a standalone window as illustrated in FIG. 10. In another embodiment, the social gaming log 1028 can be integrated into the social gaming communications window 1022.

Figure 11A:
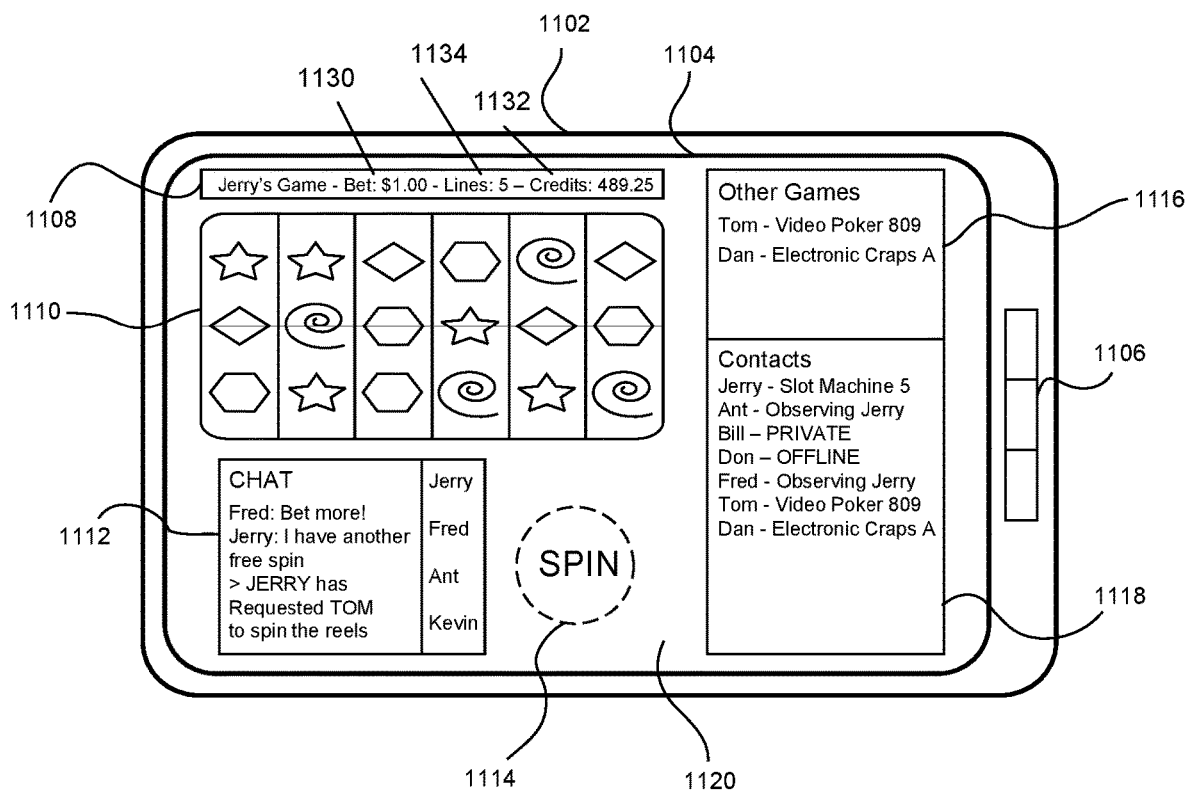
FIGS. 11A and 11B illustrate one embodiment of an example remote graphical user interface presented on a portable electronic device.
Figure 11B:
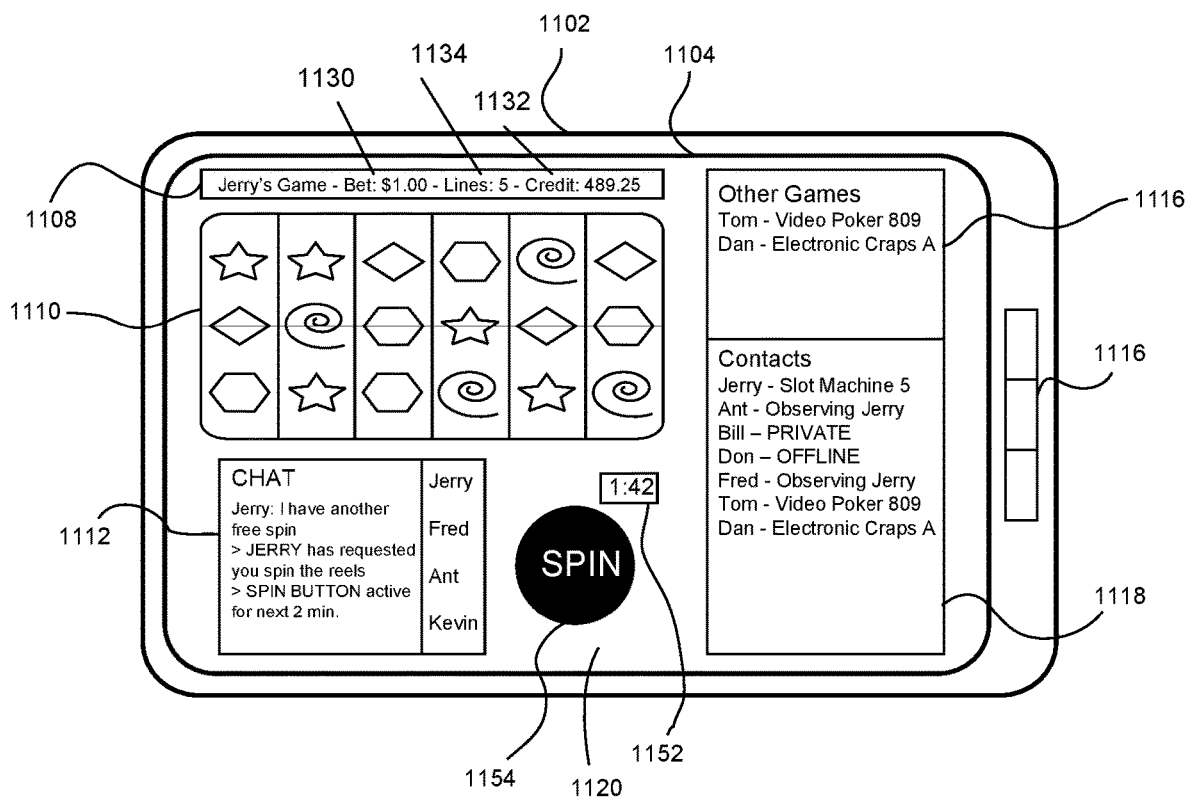

FIGS. 11A and 11B illustrate one embodiment of an example remote graphical user interface presented on a portable electronic device. Referring to FIG. 11A, a remote GUI 1120 can be presented on a display 1104 of a portable electronic device 1102. Although FIG. 11A is described in reference to portable electronic devices, the GUI 1120 can be presented on a display of any user device such as computing devices or gaming machines. The portable electronic device 1102 can be a mobile phone, a portable media player, a personal digital assistant, a portable gaming device, or any other similar device. In one embodiment, the display 1104 can be a liquid crystal display screen, organic light-emitting diode screen or any other type of display device found in portable electronic devices. The display 1104 can have touch screen capabilities that may allow a user to manipulate the remote social gaming interface 1120. In another embodiment, the portable electronic device 1102 may also have physical buttons or keys 1106 that can also allow the user to manipulate the GUI 1120. In still another embodiment, the buttons or keys may be virtually presented on the display 1104.

The remote social gaming interface 1120 may include a remote game of chance window 1110 and a remote game of chance information window 1108. The remote game of chance window 1110 can display a representation of the game of chance being played on a gaming machine by a player. The game of chance may be reel-based slot games, video poker, video blackjack, lottery games, electronic table games, or any other primary games of chance. In one embodiment, the remote game of chance window 1110 may display a real-time stream of the game of chance from the gaming machine. If the game of chance is digitally displayed on the gaming machine, the real-time stream may mirror a display of the gaming machine on the remote game chance of window 1110. For example, if the game of chance involves physical reels, cards, dice, or similar gaming objects, a camera may capture activity of the game of chance. The real-time stream can be generated using flash video technology, HTML 5, or other codecs and technology commonly used for streaming video over a network. In another embodiment, the remote game of chance window 1110 may display a real-time animation of the game of chance. For example, if the game of chance is a reel-based slot game with a plurality of physical reels, the remote game of chance window 1110 may show a digitally animated recreation of the plurality of physical reels. In yet another embodiment, the remote game of chance window 1110 may display a plurality of significant events from the game of chance posted by the social gaming server.

The remote game of chance information window 1108 can display information related to the game of chance. The information displayed in the remote game of chance information window 1108 can include a wager amount 1130, total credits 1132, pay lines 1134, or any other information typically associated with a primary game of chance. In one embodiment, the remote game of chance information window 1108 may be a standalone window as illustrated in FIG. 11A. In another embodiment, the remote game of chance information window 1108 can be integrated into the remote game of chance window 1110.

The GUI 1120 may include a remote social gaming communications window 1112. The remote social gaming communications window 1112 may contain a list of at least one contact that may be selected to participate in the social game session. The at least one contact may be any one or combination of the local user, remote user, or third party user as illustrated in FIG. 1. In one embodiment, the contacts may be listed using alpha-numeric text. In another embodiment, the contacts can be listed using visual indicators such as pictures, logos, avatars, icons, graphics, real-time video feed and other static and dynamic visual indicia or method. The remote social gaming communications window 1112 may convey communication between the contacts participating in the social game session. In one embodiment, the communication may be text based. In another embodiment the communication can be a video chat with an optional text transcription.

The GUI 1120 may include a contact list 1118. The contact list 1118 can display a list of contacts for selection by the player. In one embodiment, the plurality of social contacts can be represented by alpha-numeric text such as, but not only, a name, an email address, a phone number, or an alias. In another embodiment, the plurality of social contacts in the contact list 1118 may be represented by pictures, icons, avatars, or other indicia. Although not illustrated, each contact may be associated with a status indicator, options, and the like as discussed with reference FIG. 10.

The GUI 1120 may include a social game session list 1116. The social game session list 1116 can list any active social game sessions the contact is currently participating or observing. The contact may be connected to a first social game session and may be able to join or observe a second social game session. Upon joining the second social game session, content from the remote game of chance window 1110, the remote game of chance information window 1108, and the remote social gaming communications window 1112 may switch from that of the first social game session to that of the second social game session. The social game session list 1116 may also updated to reflect the current social game session.

The GUI 1120 may include a remote input indicator 1114. FIG. 11A illustrates the remote input indicator 1114 in an inactive mode. In this embodiment, the remote input indicator 1114 is illustrated in dashed lines. However, this is not intended to be limiting as the remote input indicator 1114 may be indicated as being inactive by any other presentation such as being faded, visibly faint, unfilled, blacked out, and the like.

When inactive, the remote input indicator 1114 can indicate that the player has not selected the contact to make the remote input or that the remote input has not been enabled on the portable electronic device.

Although the inactive remote input indicator 1114 is illustrated with a spin label, this is not intended to be limiting. The remote input indicator may be based upon the type and theme of the social game session. For example, if the social game session is a video blackjack, the remote input indicator may have a "hit", "stay", and "double down" label.

Referring now to FIG. 11B, the GUI 1120 may have an active remote input indicator 1154. When active, the remote input indicator 1154 can indicate that the player has selected the contact to make the remote input and/or that the remote input indicator 1154 has been enabled on the portable electronic device 1102. As illustrated, the active remote input indicator 1154 may be solid to represent activeness. In another embodiment, a border of the active remote input indicator 1154 may be solid to represent activeness. In yet another embodiment, the active remote input indicator 1154 may be a predetermined color to represent activeness. For example, the active remote input indicator 1154 can be red. In still another embodiment, the active remote input indicator 1154 may blink to represent activeness.

Moreover, the remote social gaming communications window 1112 may indicate the contact has been selected to participate in the social gaming session. As illustrated, "JERRY has requested that you spin the reels" may be presented.

A timer 1152 may be presented on the GUI 1120. The user may have a predetermined period of time to participate in the social gaming session. The timer 1152 may inform the user of the time left to participate. For example, the user may have one minute forty-two seconds to participate in the social gaming session by selecting the remote input indicator 1154. The portable electronic device 1102 may refresh the timer 1152 as the amount of time left decreases. The timer 1152 may continue to refresh until the amount of time left decreases to "0". The timer 1152 may be presented using digital numbers, clock face, or any other time representation. In one embodiment, the timer 1152 can simply display the total amount of seconds. In one embodiment, the timer 1152 may be visible when the remote input indicator is active.

When selected by the contact, the portable electronic device 1102 can transmit the remote input from the portable electronic device 1102 to a social gaming server, a gaming server, or a gaming machine via a network (as illustrated in FIGS. 1 and 2).

Figure 12:
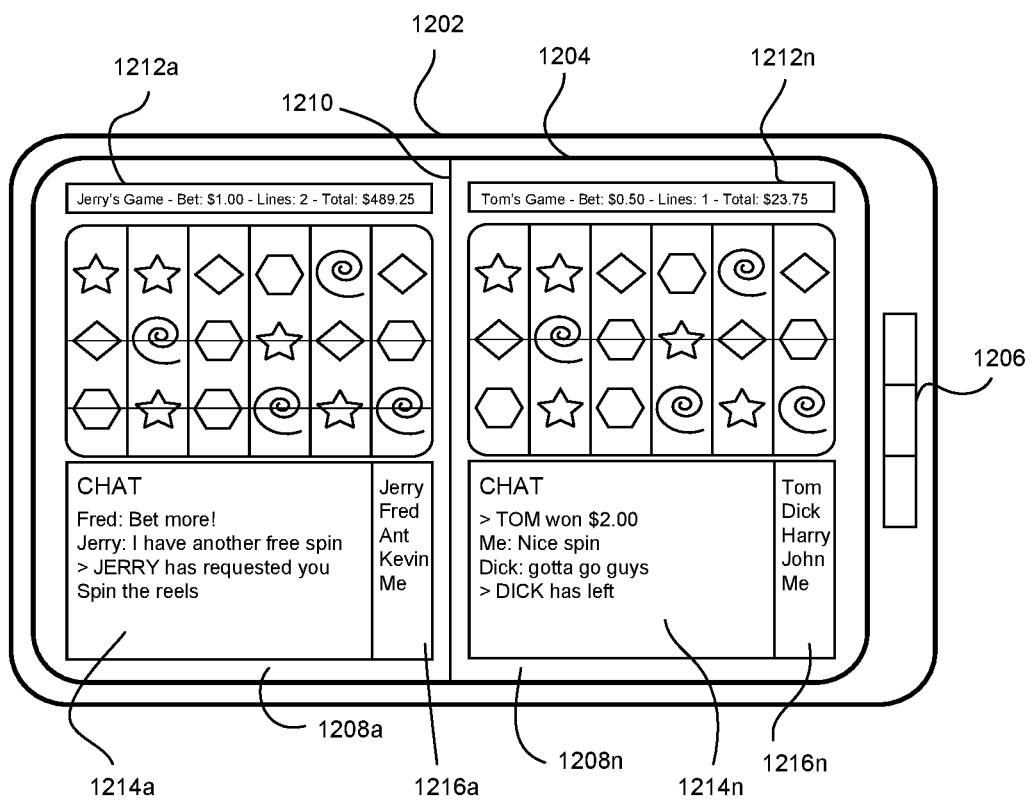
FIG. 12 illustrates another embodiment of a graphical user interface presented on a portable electronic device.

FIG. 12 illustrates another embodiment of a graphical user interface presented on a portable electronic device. A remote social gaming interface 1210 can be presented on a display 1204 of a portable electronic device 1202. Although FIG. 12 is described in reference to portable electronic devices, the remote social gaming interface 1210 can be presented on a display of any user device as discussed above.

The remote social gaming interface 1210 may include a plurality of social game session monitoring windows 1208-1208n. While FIG. 12 is illustrated with two social game session monitoring windows, this is not intended to be limiting as the GUI 1210 may include any number of social game session monitoring windows. Each of the plurality of social game session monitoring windows 1208-1208n may monitor a different social game session. Each of the plurality of social game session monitoring windows 1208-1208n may include, but is not limited to, a remote game of chance information window and a remote social gaming communications window for a particular social game session.

A new social game session monitoring window 1208a-1208n may be generated when the user joins a new social game session. In one embodiment, upon the user joining the new social game session, the remote social gaming interface 1210 can resize existing social game session monitoring windows 1208a-1208n to accommodate the new social game session. In one embodiment, the GUI 1210 may automatically be resized to equally allocate space for each social game session monitoring window 1208-1208n. 1208-1208n For example, for two social game session monitoring windows 1208-1208n, each window 1208-1208n may be allocated half of the GUI 1210. If the contact joins a new social game session, the GUI 1210 may divide and present each social gaming session monitoring window 1208-1208n on one third of the GUI 1210. Thus, the social gaming session monitoring windows 1208-1208n are equal in size.

In another embodiment, the plurality of social game session monitoring windows 1208-1208n may be different sizes. The size of each game session monitoring window 1208-1208n may depend upon any number of factors including, but not limited to, user preference, level of activity, wager amount, or request for a remote participation input. For example, for game sessions having a lower credit amount, the game session monitoring window 1208-1208n may be smaller than a game session having a larger credit amount. In another example, the user may manually allocate the size for each social game session monitoring window 1208-1208n.

Figure 13:
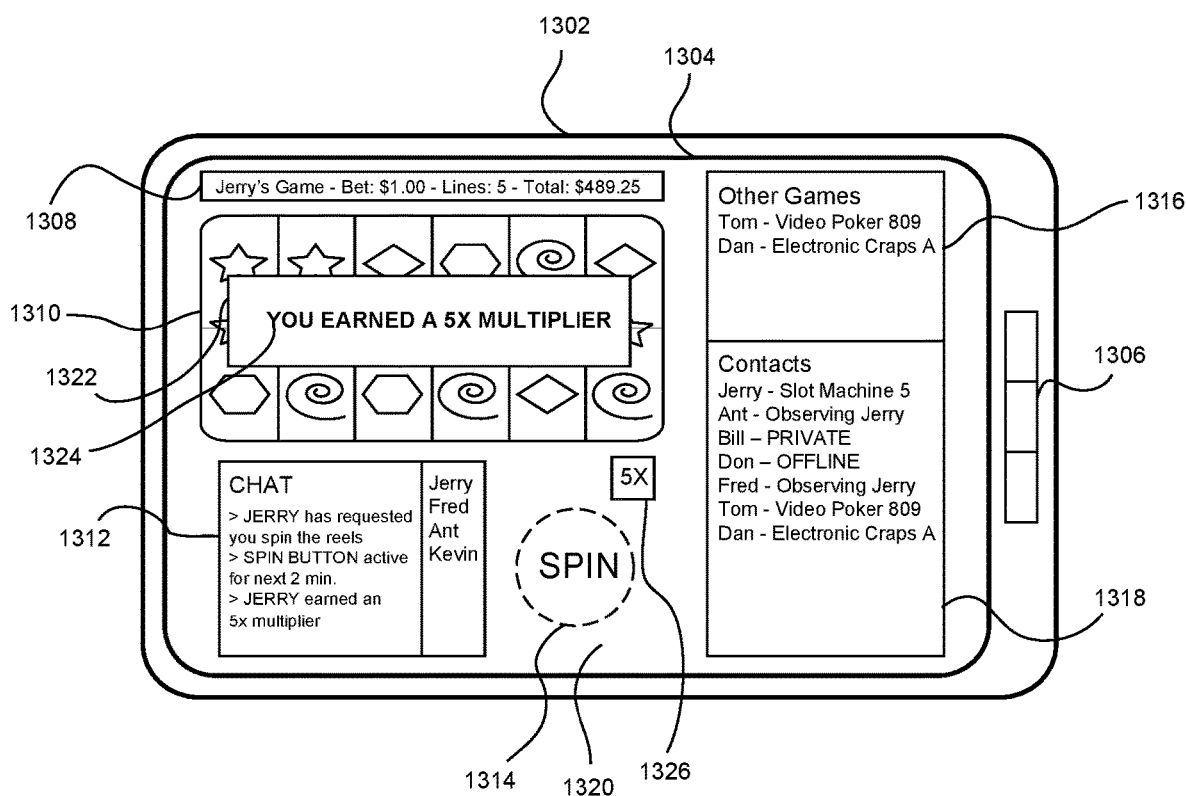
FIG. 13 illustrates yet another embodiment of an example graphical user interface presented on a display of a portable electronic device.

FIG. 13 illustrates yet another embodiment of an example graphical user interface presented on a display of a portable electronic device. The GUI 1320 can be presented on a display 1304 of a portable electronic device 1302. The portable electronic device 1302 may have physical buttons or keys 1306 that can also allow the contact to manipulate the GUI 1320. The GUI 1320 may include a remote game of chance window 1310 and a remote game of chance information window 1308 similar to the GUI illustrated in FIGS. 10-12.

The remote game of chance window 1310 may display a real-time stream of the game of chance being played by JERRY. The real-time stream may mirror a display of the gaming machine on the remote game chance of window 1310. The streaming of at least a portion of game information from the gaming machine may be transmitted by a game server, a social gaming server, or any other server. In one embodiment, the remote game of chance window 1310 may display a plurality of events from the game of chance posted by the social gaming server. As illustrated, "SPIN BUTTON active for next 2 min." is an event that is currently occurring.

The remote game of chance information window 1308 can also display information related to the game of chance, a remote social gaming communications window 1312, a remote social contact list 1318, a social game session list 1316, a remote input indicator 1314, as discussed above. The GUI 1320 may also have an award notification 1322 to inform the user that an award has been earned. The award notification 1322 may become visible when the player or the user has earned an award as discussed in detail above. Although the award notification 1322 is illustrated in FIG. 13 on top of the remote game of chance window 1310, this is not intended to be limiting as the award notification 1322 can be presented or displayed anywhere in the GUI 1320 on the display 1304. In one example, the award notification 1322 may include a description 1324 describing the award such as "YOU EARNED A 5× MULTIPLIER". The award notification 1322 may also include graphics such as, but not only, an icon to visually represent the award.

The GUI 1320 may alternatively display an award icon 1326. The award icon 1326 may indicate that the user received a new award. The award icon 1326 can be any graphic, logo, or picture that can represent the award. For example, if the user earns a 5x win multiplier by remotely participating in the game of chance, the award icon 1326 can be a box printed with a "5×" indicia. In one embodiment, the contact may receive the new award simply by participating in the social game session. The contact may also receive the new award because the player gifted the new award to the contact.

In one embodiment, the contact may select the award icon 1326 to associate and save the award for the contact, transfer the award back to the player, or redeem the award as discussed in detail in FIG. 8.

While embodiments and applications of this invention have been shown and described, it would be apparent to those skilled in the art having the benefit of this disclosure that many more modifications than mentioned above are possible without departing from the inventive concepts herein.

What is claimed is:

1. A social gaming system that interacts with at least one gaming machine configured to play a game of chance and produce game information, the at least one gaming machine having at least one currency, ticket or card acceptor to support play of the game of chance, the social gaming system comprising:
    a social gaming server configured to:
        communicate with the at least one gaming machine;
        communicate with a social networking server to obtain a set of social contacts associated with a player at the at least one gaming machine, the social networking server storing a plurality of social contacts for a plurality of users;
        form a list of at least one social contact from the set of social contacts;
        transmit the list of at least one social contact to the at least one gaming machine;
        cause display of the list of at least one social contact on at least a portion of a display of the at least one gaming machine;
        facilitate concurrently display the game of chance on another portion of the display of the at least one gaming machine;
        receive a selection of at least one social contact from the list of at least one social contact;
        authenticate at least one user device associated with the at least one social contact received;
        establish a remote gaming session between the at least one gaming machine and the at least one user device associated with the at least one social contact selected when the at least one user device selected is authenticated to enable the at least one user device to at least monitor the game of chance being played on the at least one gaming machine;
        cause display of an indication on the display of the at least one gaming machine based on the at least one user device, wherein the indication denotes whether the at least one user device is monitoring the game of chance being played on the at least one gaming machine;
        distribute at least a portion of the game information to the at least one user device by posting the at least a portion of the game information to the social networking server;
        determine a location of the at least one user device;
        limit the at least one user device to participate in the game of chance based on the location of the at least one user device; and
        compare a key file stored in the at least one user device associated with the at least one social contact received with a record maintained on the social networking server for authentication,
    wherein the at least a portion of the game information distributed to the at least one user device includes real-time data provided by the game of chance being played on the at least one gaming machine.

2. The social gaming system of claim 1, wherein the social gaming server is further configured to authenticate the at least one user device associated with the at least one social contact received by confirming validity of at least one of a password, a biometric identifier, a personal identification number, and a unique address associated with the at least one user device.

3. The social gaming system of claim 1, wherein the social gaming server is further configured to authenticate the at least one user device using a unique address and determine whether an input is received from a remote user within a predetermined period of time.

4. The social gaming system of claim 1, wherein the social gaming server is further configured to cause display of active users in the list of at least one social contact.

5. The social gaming system of claim 1, wherein the social gaming server is further configured to:
    determine a location of the at least one user device; and
    determine eligibility of the at least one user device to receive the game information based on the location of the at least one user device.

6. A method for distributing game information, comprising:
    determining if a wager is received at a gaming device;
    operating a game of chance on the gaming device to produce the game information when the wager is received;
    displaying the game of chance on a first portion of a display of the gaming device;
    accessing a social networking server to obtain a set of social contacts associated with a user of the gaming device, the social networking server storing a plurality of social contacts for a plurality of users;
    displaying the set of social contacts on a second portion of the display of the gaming device, the set of social contacts being associated with the user of the gaming device, wherein each of the plurality of social contacts are available for monitoring or participating in the game of chance being played on the gaming device when authenticated;
    receiving a selection of at least one of the social contacts from the set of social contacts to monitor or participate in the game of chance being played on the gaming device;
    identifying at least one remote user device associated with at least one social contact in the selection;
    authenticating the at least one remote user device associated with the at least one social contact; and
    distributing at least a portion of the game information from the game of chance to the at least one remote user device when the at least one remote user device is authenticated by posting the at least a portion of the game information to the social networking server;
    determining a location of the at least one remote user device;
    limiting the at least one remote user device to participate in the game of chance based on the location of the at least one remote user device; and
    comparing a key file stored in the at least one remote user device associated with the at least one social contact received with a record maintained on the social networking server for authentication,
    wherein the game of chance operates on the gaming device and not on the at least one remote user device.

7. The method of claim 6, further comprising authenticating the at least one user remote device associated with the at least one social contact received by confirming validity of at least one of a password, a biometric identifier, a personal identification number, and a unique address associated with the at least one remote user device.

8. The method of claim 6, furthercomprising authenticating the at leastone remote user device using a unique address and determining whether an input is received from a remote user within a predetermined period of time.

9. The method of claim 6, further comprising identifying only remote user devices.

10. The method of claim 6, further comprising:
   determining a location of the at least one remote user device; and
   determining eligibility of the at least one remote user device to receive the game information based on the location of the at least one remote user device.

11. A social gaming system that interacts with at least one gaming machine configured to play a game of chance and produce game information, the at least one gaming machine having at least one currency, ticket or card acceptor to support play of the game of chance, the social gaming system comprising:
   a social gaming server configured to:
      communicate with the at least one gaming machine;
      communicate with a social networking server to obtain a set of social contacts associated with a player at the at least one gaming machine, the social networking server storing a plurality of social contacts fora plurality of users;
      form a list of at least one social contact from the set of social contacts;
      transmit the list of at least one social contact to the at least one gaming machine;
      cause display of the list of at least one social contact on at least a portion of a display of the at least one gaming machine;
      facilitate concurrently display the game of chance on another portion of the display of the at least one gaming machine;
      authenticate at least one user device associated with at least one social contact;
      establish a remote gaming session between the at least one gaming machine and at least one user device that is authenticated, wherein, the at least one user device is thereby enabled to at least monitor the game of chance being played on the at least one gaming machine;
      cause display of an indication on the display of the at least one gaming machine based on the at least one social contact, wherein the indication denotes whether the at least one social contact selected is monitoring the game of chance being played on the at least one gaming machine;
      determine a location of the at least one user device;
      limit the at least one user device to participate in the game of chance based on the location of the at least one user device;
      compare a key file stored in the at least one user device associated with the at least one social contact received with a record maintained on the social networking server for authentication; and
      distribute at least a portion of the game information to the at least one user device that is authenticated by posting the at least a portion of the game information to the social networking server, wherein the at least a portion of the game information distributed to the at least one user devicethat is authenticated includes real-time data provided by the game of chance being played on the at least one gaming machine.

12. The social gaming system of claim 11, wherein the social gaming server is further configured to authenticate the at least one user device associated with the at least one social contact received by confirming validity of at least one of a password, a biometric identifier, a personal identification number, and a unique address associated with the at least one user device.

13. The social gaming system of claim 11, wherein the social gaming serveris further configured to authenticate the at least one user device using a unique address and determine whether an input is received from a remote user within a predetermined period of time.

14. The social gaming system of claim 11, wherein the social gaming serveris further configured to cause display of active users in the list of at least one social contact.

* * * * *